United States Patent
Gunji et al.

(10) Patent No.: US 11,688,847 B2
(45) Date of Patent: Jun. 27, 2023

(54) METHOD AND FIRING APPARATUS FOR MANUFACTURING CATHODE ACTIVE MATERIAL FOR LITHIUM ION SECONDARY BATTERY

(71) Applicant: Proterial, Ltd., Tokyo (JP)

(72) Inventors: Akira Gunji, Tokyo (JP); Tatsuya Toyama, Tokyo (JP); Akio Takeuchi, Tokyo (JP); Hisato Tokoro, Tokyo (JP); Shuichi Takano, Tokyo (JP); Genei Nakajima, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 282 days.

(21) Appl. No.: 16/645,350

(22) PCT Filed: Nov. 21, 2018

(86) PCT No.: PCT/JP2018/043020
§ 371 (c)(1),
(2) Date: Mar. 6, 2020

(87) PCT Pub. No.: WO2019/103046
PCT Pub. Date: May 31, 2019

(65) Prior Publication Data
US 2021/0126237 A1  Apr. 29, 2021

(30) Foreign Application Priority Data
Nov. 21, 2017 (JP) .............................. JP2017-223387

(51) Int. Cl.
*H01M 4/04* (2006.01)
*H01M 4/131* (2010.01)
(Continued)

(52) U.S. Cl.
CPC ......... *H01M 4/0471* (2013.01); *H01M 4/131* (2013.01); *H01M 4/134* (2013.01);
(Continued)

(58) Field of Classification Search
CPC .......... H01M 4/04; H01M 4/134; H01M 4/36; H01M 4/131; H01M 4/525
See application file for complete search history.

(56) References Cited

U.S. PATENT DOCUMENTS

| 2003/0124422 A1* | 7/2003 | Cintra ................... H01M 4/139 429/232 |
| 2009/0194734 A1 | 8/2009 | Arimoto |
| 2016/0156020 A1 | 6/2016 | Tokoro et al. |

FOREIGN PATENT DOCUMENTS

| JP | 2010-269947 A | 12/2010 |
| JP | 2016-110982 A | 6/2016 |

(Continued)

OTHER PUBLICATIONS

International Search Report, PCT/JP2018/043020, dated Feb. 19, 2019, 1 pg.
(Continued)

*Primary Examiner* — Kenneth J Douyette
(74) *Attorney, Agent, or Firm* — Volpe Koenig

(57) ABSTRACT

A method for manufacturing a cathode active material for a lithium ion secondary battery comprises mixing lithium carbonate and a compound containing a metal element other than Li, and a firing step. The firing step includes at last two stages of controlling firing to different temperatures. The at least two stages include controlling a firing temperature to a lower temperature and controlling a firing temperature to a higher temperature. The firing is controlled is such that the former stage has a lower oxygen concentration in an atmosphere than the latter stage. The firing apparatus comprises at least two firing furnaces of controlling firing temperatures to different temperatures. The at least two firing furnaces include controlling a firing temperature to a lower temperature and controlling firing temperature to a higher temperature. The latter firing furnace has a gas outlet being in communication with the former firing furnace.

7 Claims, 5 Drawing Sheets

(51) Int. Cl.
  *H01M 4/134*      (2010.01)
  *H01M 10/0525*    (2010.01)
  *H01M 4/1391*     (2010.01)
  *H01M 4/1395*     (2010.01)
  *H01M 4/36*       (2006.01)
  *H01M 4/525*      (2010.01)

(52) U.S. Cl.
  CPC ....... *H01M 4/1391* (2013.01); *H01M 4/1395* (2013.01); *H01M 4/364* (2013.01); *H01M 4/525* (2013.01); *H01M 10/0525* (2013.01)

(56) References Cited

FOREIGN PATENT DOCUMENTS

| WO | 2009/098835 A1 |   | 8/2009  |
|----|----------------|---|---------|
| WO | WO-2016/083205 A | * | 6/2016 |
| WO | 2017/221554 A1 |   | 12/2017 |
| WO | 2018/070517 A1 |   | 4/2018  |

OTHER PUBLICATIONS

Written Opinion, PCT/JP2018/043020, dated Feb. 19, 2019, 4 pgs. (Japanese language only).

* cited by examiner

METHOD AND FIRING APPARATUS FOR MANUFACTURING CATHODE ACTIVE MATERIAL FOR LITHIUM ION SECONDARY BATTERY

TECHNICAL FIELD

The present invention relates to a method for manufacturing a cathode active material for a lithium ion secondary battery, and a firing apparatus used in the same.

BACKGROUND ART

Lithium ion secondary batteries have been widely used as a small-sized and lightweight secondary battery having a high energy density. The lithium ion secondary battery is featured by its high energy density and small memory effect, as compared with other secondary batteries such as nickel hydride battery and nickel cadmium battery. Hence its applications are expanding from small-sized power sources for mobile electronic devices and home electric appliances; up to middle- to large-sized power sources including stationary power sources such as power storage device, uninterruptible power supply, and power leveling device, as well as driving power sources for vessels, railway vehicles, hybrid railway vehicles, hybrid cars, and electric cars.

As one type of the cathode active material for a lithium ion secondary battery, there are lithium composite compounds having an α-NaFeO$_2$ type crystal structure. LiNiO$_2$-based oxides having a higher nickel content, included in this type of lithium composite compound, exhibit a higher charge-discharge capacity and are therefore expected to be applied to various uses. However, it is known that a lithium composite compound having a higher nickel content has lower structural stability and is easily degraded with a charge-discharge cycle or higher-temperature storage.

Conventionally, a solid phase process has been widely used as a method for manufacturing a lithium composite compound. However, it is known that, when a lithium composite compound having a higher nickel content is synthesized by the solid phase process, insufficient oxidation of nickel causes, for example, cation mixing in which divalent nickel is mixed into lithium sites, and the electrochemical activity decreases. Therefore, in order to obtain crystals having less inactive phase and higher purity in a lithium composite compound having a higher nickel content, studies including a firing process have been widely conducted.

For example, Patent Literature 1 describes a method for manufacturing a lithium-containing transition metal oxide represented by the general formula Li[Li$_x$(Ni$_a$ M$_{1-a}$)$_{1-x}$]O$_2$ wherein M represents a metal other than Li and Ni, 0≤x and 0<a. In the method, a transition metal compound containing Ni and M at a mole ratio of a:(1−a), and lithium carbonate are mixed at a certain ratio; then the thus-produced mixture is heated to a certain temperature range by repeating heating and cooling; and then the transition metal compound and lithium carbonate are reacted with each other within the certain temperature range. According to this method, oxygen or air is supplied to a cylindrical furnace of a rotary kiln.

In addition, Patent Literature 2 descries a method for manufacturing a cathode active material, including a mixing step of mixing lithium carbonate and compounds each containing a metal element other than Li, and a firing step of firing a mixture produced in the mixing step under an oxidizing atmosphere to obtain a lithium composite compound. The firing step is performed in three stages of firing, and the second firing step and the third firing step are performed in an oxidizing atmosphere having an oxygen concentration of 80% or more.

In addition, Patent Literature 3 describes a method for manufacturing a lithium-containing composite oxide, including the steps of firing a starting material containing a lithium-containing hydroxide and a nickel-containing oxide or hydroxide in a reaction chamber under an oxygen atmosphere to synthesize the lithium-containing composite oxide, supplying the reaction chamber with an oxygen gas, discharging a mixture gas containing the oxygen gas and water vapor generated in the step from the reaction chamber, separating the water vapor from the mixture gas to recover the oxygen gas, and supplying the reaction chamber with the oxygen gas recovered in the step.

CITATION LIST

Patent Literature

Patent Literature 1: International Publication No. WO2009/98835
Patent Literature 2: Japanese Patent Application Publication No. 2016-110982
Patent Literature 3: Japanese Patent Application Publication No. 2010-269947

SUMMARY OF INVENTION

Technical Problem

In order for a lithium composite compound containing nickel to exhibit its original performance, it is necessary to sufficiently oxidize nickel used as a starting material and fire a crystal having higher purity. In the solid-phase reaction process, it is necessary to maintain the firing atmosphere at a higher oxygen concentration and to exclude the impurity components, desorbed from the starting material, from the firing atmosphere. In addition, it is desired that the firing time be sufficiently long.

However, in the method including simply continuing to supply an oxygen gas as in Patent Literature 1, the supply cost of the oxygen gas is large. In addition, in the case of performing firing by supplying air, oxidation of nickel does not sufficiently proceed, and an active layered structure is not formed at higher purity. Therefore, there is a high possibility that a higher charge-discharge capacity cannot be obtained. Moreover, in the case of performing a multi-stage firing step by controlling the firing temperatures different from each other as in Patent Literature 2, the cost of atmospheric gas is higher when controlling each atmosphere.

Particularly in the case of using lithium carbonate as the starting material of a lithium composite compound, carbon dioxide is desorbed at a higher temperature than in the case of lithium hydroxide, which releases water vapor to the firing atmosphere as in Patent Literature 3. Therefore, in the case of performing a higher-temperature firing for the purpose of crystal growth or the like, there is a possibility that the partial pressure of oxygen locally decreases and oxidation of nickel becomes difficult to proceed, or a carbonate component is taken in and the purity of the crystals becomes lower.

Under such circumstances, there is a need for a new manufacturing process which is capable of achieving at a lower cost a firing atmosphere suitable for firing a lithium composite compound, and is capable of industrially manufacturing at a lower manufacturing cost a cathode active material exhibiting a higher charge-discharge capacity.

In view of the above, an object of the present invention is to provide a method for manufacturing a cathode active material for a lithium ion secondary battery, which makes it possible to manufacture a cathode active material for a lithium ion secondary battery having a higher crystal purity and a higher capacity by performing firing while suppressing the manufacturing cost, and a firing apparatus used in the same.

Solution to Problem

In order to achieve the above object, a method for manufacturing a cathode active material for a lithium ion secondary battery according to the present invention is a method for manufacturing a cathode active material used for a lithium ion secondary battery and represented by the following formula (1), comprising: a mixing step of mixing lithium carbonate and a compound containing a metal element shown in the following formula (1) other than Li; and a firing step of producing a lithium composite compound represented by the following formula (1) by firing a precursor produced through the mixing step, wherein the firing step includes two or more stages of controlling firing temperatures to different temperatures respectively, the two or more stages include a stage of controlling a firing temperature to a lower temperature and a stage of controlling a firing temperature to a higher temperature, and the firing is controlled in such a way that the former stage has a lower oxygen concentration in an atmosphere than the latter stage

$$Li_{1+a}M1O_{2+\alpha} \quad (1)$$

provided that (a) in the formula (1), M1 is a metal element other than Li and contains at least Ni, and (b) a and α are numbers satisfying $-0.1 \leq a \leq 0.2$ and $-0.2 \leq \alpha \leq 0.2$ respectively.

In addition, a firing apparatus used for manufacturing a cathode active material for a lithium ion secondary battery comprises: firing furnaces for sequentially firing a precursor produced by mixing lithium carbonate and a compound containing a metal element shown in the following formula (1) other than Li, wherein the firing furnaces include two or more firing furnaces of controlling firing temperatures to different temperatures respectively, the two or more firing furnaces include a firing furnace of controlling a firing temperature to a higher temperature and a firing furnace of controlling a firing temperature to a lower temperature, the former firing furnace has a gas outlet discharging a gas therein and being in communication with a gas inlet of the latter firing furnace, and the firing is performed while a gas discharged from the former firing furnace is introduced into an atmosphere of the latter firing furnace

$$Li_{1+a}M1O_{2+\alpha} \quad (1)$$

provided that (a) in the formula (1), M1 is a metal element other than Li and contains at least Ni, and (b) a and α are numbers satisfying $-0.1 \leq a \leq 0.2$ and $-0.2 \leq \alpha \leq 0.2$ respectively.

Advantageous Effects of Invention

The present invention makes it possible to manufacture a cathode active material for a lithium ion secondary battery having a higher crystal purity and a higher capacity by performing firing while suppressing the manufacturing cost.

DESCRIPTION OF EMBODIMENTS

Figure 1:
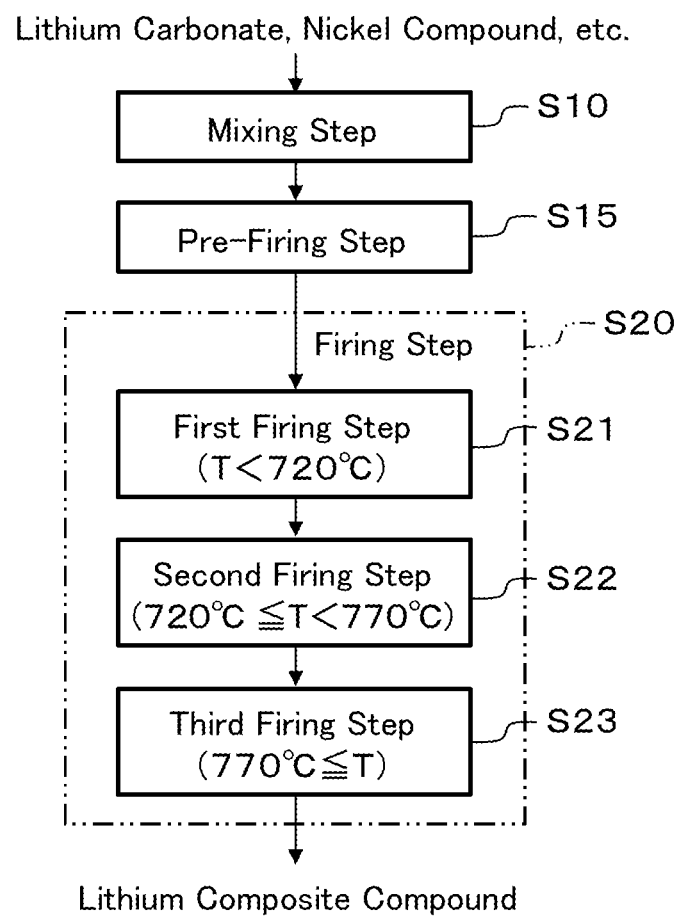
FIG. 1 is a flowchart of a method for manufacturing a cathode active material for a lithium ion secondary battery according to an embodiment of the present invention.

Hereinafter, detailed description is provided for a method for manufacturing a cathode active material for a lithium ion secondary battery according to an embodiment of the present invention, and a firing apparatus used in the same. Note that the same reference numerals are given to common configurations in the following figures, and redundant description is omitted.

[Cathode Active Material]

The cathode active material manufactured by the method for manufacturing a cathode active material for a lithium ion secondary battery according to the present embodiment is used as a material for the cathode of a lithium ion secondary battery. The cathode active material is a lithium composite oxide (lithium composite compound) having an α-NaFeO₂ type layered structure as a crystal structure and containing lithium and a transition metal.

Specifically, the cathode active material manufactured by the manufacturing method according to the present embodiment has a composition represented by the following formula (1)

$$Li_{1+a}M1O_{2+\alpha} \quad (1)$$

provided that (a) in the formula (1), M1 is a metal element other than Li and contains at least Ni, and (b) a and α are numbers satisfying $-0.1 \leq a \leq 0.2$ and $-0.2 \leq \alpha \leq 0.2$ respectively.

Since the cathode active material represented by the formula (1) contains nickel, the cathode active material can exhibit a higher charge-discharge capacity than LiCoO₂ or the like in a range up to near 4.3 V. In addition, since nickel is contained, it is advantageous that the cathode active material is lower in starting material cost than that of $LiCoO_2$ or the like, and is easily available. In the above formula (1), the ratio of Ni relative to M1 is preferably 60 atom % or more, and more preferably 70 atom % or more.

The cathode active material manufactured by the manufacturing method according to the present embodiment preferably has a composition represented by the following formula (2)

$$Li_{1+a}Ni_xCo_yM2_{1-x-y-z}M3_zO_{2+\alpha} \quad (2)$$

provided that (a) in the formula (2), M2 is at least one element selected from the group consisting of Mn and Al, (b) M3 is at least one element selected from the group consisting of Mg, Ti, Zr, Mo, and Nb, and (c) a, x, y, z, and α are numbers satisfying $-0.1 \le a \le 0.2$, $0.7 \le c < 1.0$, $0 \le y < 0.3$, $0 \le z \le 0.25$, $0 < 1-x-y-z < 0.3$, and $-0.2 \le \alpha \le 0.2$ respectively.

In the cathode active material represented by the formula (2), since part of the nickel is elementally substituted by the element represented by M2 or further by cobalt or the element represented by M3, structural change of crystals due to charge and discharge is suppressed, and the charge-discharge cycle characteristic is further improved. In addition, since the thermal stability is increased, the cathode active material has improved stability during higher-temperature storage.

Now, significance of the numerical ranges of a, x, y, z, and a in the formulae (1) and (2) will be explained.

In the above formula, "a" is defined to be −0.1 or more and 0.2 or less. The coefficient "a" represents the excess or deficiency of lithium based on the stoichiometric ratio of the lithium composite compound represented by the general formula: $LiM1O_2$, that is, Li:M1:O=1:1:2. When the amount of lithium is excessively small, the charge-discharge capacity of the cathode active material decreases. On the other hand, when the amount of lithium is excessively large, the charge-discharge cycle characteristic deteriorates. With the coefficient "a" controlled within the above numerical range, it is possible to achieve both a higher charge-discharge capacity and a good charge-discharge cycle characteristic.

The coefficient "a" may be −0.02 or more and 0.05 or less. When the coefficient "a" is −0.02 or more, a sufficient amount of lithium to contribute to charge and discharge is secured, making it possible to increase the charge-discharge capacity of the cathode active material. In addition, when the coefficient "a" is 0.05 or less, the charge compensation by the change in the valence of the transition metal is sufficiently performed, making it possible to achieve both a higher charge-discharge capacity and a good charge-discharge cycle characteristic.

A coefficient "x" for nickel is defined to be 0.7 or more and less than 1.0. A higher ratio of nickel relative to a metal element other than lithium is advantageous in increasing the capacity, and when the ratio of nickel exceeds 70 atom %, a sufficiently higher charge-discharge capacity is obtained. Therefore, by defining the coefficient "x" in the above numerical range, a cathode active material exhibiting a higher charge-discharge capacity can be manufactured at a lower cost than $LiCoO_2$ or the like.

The coefficient "x" may be 0.75 or more and 0.95 or less, or may be 0.75 or more and 0.90 or less. When the coefficient "x" is 0.75 or more, a higher charge-discharge capacity can be obtained. When the coefficient "x" is 0.95 or less, cation mixing in which nickel is mixed into lithium sites is unlikely to occur, so that deterioration in charge-discharge capacity and charge-discharge cycle characteristic is suppressed.

A coefficient "y" for cobalt is defined to be 0 or more and less than 0.3. When cobalt is added, the crystal structure is stabilized, so that effects can be obtained such as suppression of cation mixing in which nickel is mixed into lithium sites. Therefore, the charge-discharge cycle characteristic can be improved without significantly impairing the charge-discharge capacity. On the other hand, when cobalt is excessive, the starting material cost increases, so that the manufacturing cost of the cathode active material increases. Therefore, by defining the coefficient "y" within the above numerical range, it is possible to achieve both a higher charge-discharge capacity and a good charge-discharge cycle characteristic together with good productivity.

The coefficient "y" may be 0.01 or more and 0.20 or less, or 0.03 or more and 0.20 or less. When the coefficient "y" is 0.01 or more, the effect by the elemental substitution of cobalt is sufficiently obtained, and the charge-discharge cycle characteristic is further improved. In addition, when the coefficient "y" is 0.20 or less, the starting material cost becomes lower, and the productivity of the cathode active material becomes better.

A coefficient "1-x-y-z" for M2 is greater than 0 and less than 0.3. When at least one element (M2) selected from the group consisting of manganese and aluminum is elementally substituted, the layered structure can be more stably maintained even when lithium is desorbed by charging. On the other hand, when these elements (M2) are excessive, the ratio of other transition metals such as nickel decreases, and the charge-discharge capacity of the cathode active material decreases. With the coefficient "1-x-y-z" controlled within the above numerical range, the crystal structure of the cathode active material can be kept stable, making it possible to obtain, for example, a higher charge-discharge capacity as well as a good charge-discharge cycle characteristic and thermal stability.

The element represented by M2 is preferably manganese, aluminum, and the like. Such an element contributes to stabilization of the crystal structure of a cathode material having a higher nickel content. Manganese is particularly preferable. When manganese is elementally substituted, it is possible to obtain a higher charge-discharge capacity than in the case where aluminum is elementally substituted. In addition, even when the oxidation reaction of nickel does not sufficiently proceed during the firing of the lithium composite compound, manganese in the starting material can sufficiently react with lithium carbonate in the starting material. For this reason, even during firing at a higher temperature, lithium carbonate does not remain. As a result, even when the firing temperature exceeds around 723° C., lithium carbonate does not form a liquid phase, and the coarsening of crystal grains is suppressed. Specifically, since the oxidation reaction of nickel can be allowed to proceed at a higher temperature while suppressing the coarsening of crystal grains, it is possible to efficiently obtain a cathode active material exhibiting a higher charge-discharge capacity.

When manganese is substituted as the element represented by M2, the coefficient "1-x-y-z" for M2 is preferably 0.02 or more, and more preferably 0.04 or more. As the coefficient "1-x-y-z" for M2 is larger, the effect by the elemental substitution of manganese is more sufficiently obtained. Specifically, the oxidation reaction of nickel can be allowed to proceed at a higher temperature, and a cathode active material having a higher charge-discharge capacity can be obtained more efficiently. In addition, the coefficient "1-x-y-z" for M2 is preferably 0.18 or less. When the coefficient "1-x-y-z" for M2 is 0.18 or less, the charge-discharge capacity is kept higher even in the case of elemental substitution.

The coefficient "z" for M3 is defined to be 0 or more and 0.25 or less. When at least one element (M3) selected from the group consisting of magnesium, titanium, zirconium, molybdenum, and niobium is elementally substituted, performance such as charge-discharge cycle characteristic can be improved while maintaining the activity of the cathode active material. On the other hand, when these elements (M3) are excessive, the ratio of other transition metals such as nickel decreases, and the charge-discharge capacity of the cathode active material decreases. With the coefficient "z" controlled within the above numerical range, it is possible to achieve, for example, a higher charge-discharge capacity as well as a good charge-discharge cycle characteristic.

In the above formula, a is defined to be −0.2 or more and 0.2 or less. The coefficient "α" represents the excess or deficiency of oxygen based on the stoichiometric ratio of the lithium composite compound represented by the general formula: $LiM1O_2$, that is, Li:M1:O=1:1:2. With the coefficient "a" controlled within the above numerical range, the crystal structure will have less defect, so that it is possible to obtain a higher charge-discharge capacity and a good charge-discharge cycle characteristic.

The crystal structure of the cathode active material can be confirmed by, for example, X-ray diffraction (XRD) or the like. In addition, the composition of the cathode active material can be confirmed by high-frequency inductively coupled plasma (ICP) emission spectroscopy, atomic absorption spectroscopy (AAS), or the like.

The average particle size of the primary particles of the lithium composite compound is preferably 0.1 μm or more and 2 μm or less. When the average particle size is within this range, the filling property of the cathode is improved, making it possible to manufacture a cathode having a higher molding density. In addition, since scattering and aggregation of the powdery lithium composite compound are reduced, handleability is also improved. The lithium composite compound may form secondary particles. Although it depends on the specifications and the like of the cathode, the average particle size of the secondary particles of the lithium composite compound may be, for example, 3 μm or more and 50 μm or less.

The BET specific surface area of the lithium composite compound is preferably 0.1 $m^2/g$ or more and 2.0 $m^2/g$ or less. When the BET specific surface area of the powdery lithium composite compound is within this range, it is possible to manufacture a cathode having a sufficiently higher molding density, electrode reaction rate, and volume energy density. The BET specific surface area of the lithium composite compound is more preferably 0.6 $m^2/g$ or more and 1.2 $m^2/g$ or less.

The particle breaking strength of the lithium composite compound is preferably 10 MPa or more and 200 MPa or less. When the particle breaking strength is within this range, the particles of the lithium composite compound are less likely to be broken in the process of preparing the cathode. Therefore, when the cathode current collector is coated with a cathode mixture containing a lithium composite compound to form a cathode mixture layer, coating defects such as flaking are less likely to occur. The particle breaking strength of the lithium composite compound can be measured, for example, using a micro compression tester capable of measurement at individual particle level.

[Method for Manufacturing Cathode Active Material]

The method for manufacturing a cathode active material for a lithium ion secondary battery according to the present embodiment relates to a method for synthesizing the above-described lithium composite compound by the solid phase process using lithium carbonate as a starting material.

Since the cathode active material represented by the formula (1) contains nickel, when the oxidation reaction of nickel is insufficient or lithium is extracted during firing, an inactive phase composed of divalent nickel is likely to be generated. Therefore, it is desired to sufficiently oxidize nickel from stable divalent to trivalent, and fire a lithium composite compound having higher crystal purity and uniformity.

In order to sufficiently oxidize nickel and fire a lithium composite compound having higher crystal purity and uniformity, multi-stage firing is effective in which the firing temperature is shifted to a higher temperature as the firing proceeds. However, in the multi-stage firing, the atmosphere needs to be maintained at a higher oxygen concentration for each stage. In addition, since carbon dioxide is desorbed from lithium carbonate used as a starting material, it is necessary to perform in-furnace stirring and exhaust for each atmosphere.

As described above, in the multi-stage firing, continuous supply of oxygen gas is required to maintain the atmosphere of each stage, and supply of oxygen gas requires a large cost. Under such circumstances, regarding firing using a compound containing lithium carbonate and nickel as a starting material, the present inventors have confirmed that the minimum required oxygen partial pressure in the firing atmosphere differs depending on the firing temperature, and have found that it is possible to fire a lithium composite compound having a higher crystal purity and a higher charge-discharge capacity even when the amount of oxygen is reduced at the lower-temperature firing stage.

In view of the above, in performing multi-stage firing to fire the lithium composite compound, the present embodiment aims to reduce the cost of supplying the atmospheric gas by performing firing while controlling, among the two or more stages controlled to different firing temperatures, the stage, where the firing temperature is controlled to a lower temperature, in an atmosphere with a lower oxygen concentration than the stage controlled to a higher temperature.

FIG. 1 is a flowchart of the method for manufacturing a cathode active material for a lithium ion secondary battery according to an embodiment of the present invention. As illustrated in FIG. 1, the method for manufacturing a cathode active material for a lithium ion secondary battery according to the present embodiment includes a mixing step S10 of mixing lithium carbonate and a compound containing a metal element other than Li in the formula (1), and a firing step S20 of firing a precursor produced through the mixing step S10 to obtain a lithium composite compound represented by the formula (1).

In the mixing step S10, at least lithium carbonate is used as a starting material containing lithium. Lithium carbonate is less expensive than lithium acetate, lithium nitrate, lithium hydroxide, lithium chloride, lithium sulfate, and the like, and is easily available. In addition, since lithium carbonate is weakly alkaline, there is an advantage that damage to the firing furnace or the like is reduced. In addition, since lithium carbonate has a relatively higher melting point, it is possible to avoid the formation of a liquid phase and the production of coarse crystal grains during synthesis by the solid phase process.

In the mixing step S10, a nickel compound such as nickel hydroxide, nickel carbonate, nickel oxide, nickel sulfate, or nickel acetate can be used as a starting material containing nickel. Among these, the nickel compound used is particularly preferably nickel hydroxide, nickel carbonate, or nickel oxide.

In the mixing step S10, lithium carbonate and the nickel compound can be mixed with a cobalt compound containing cobalt, a metal compound containing an element represented by M2, a metal compound containing an element represented by M3, and the like. As the cobalt compound and the metal compound, nitrates, carbonates, sulfates, acetates, oxides, hydroxides, and the like can be used. Among these, it is particularly preferable to use a carbonate, an oxide, or a hydroxide.

In the mixing step S10, starting materials such as lithium carbonate are individually weighed, ground, and mixed to obtain a powdery mixture. A grinder used for grinding the starting materials can be any of ordinary fine grinders such as a ball mill, a jet mill, and a sand mill. The grinding of the starting materials may be wet-ground. The starting material slurry produced by wet grinding can be granulated and dried by a dryer, for example. As the dryer, for example, a spray dryer, a fluidized bed dryer, an evaporator, and the like can be used.

In the mixing step S10, the starting material such as lithium carbonate is preferably ground until the average particle size becomes 0.5 μm or less, and more preferably ground until the average particle size becomes 0.2 μm or less. When the starting material is ground to such a small particle size, the reactivity between lithium carbonate and a nickel compound is improved, and carbon dioxide is easily desorbed from lithium carbonate. In addition, the degree of mixing of the ground product is increased, so that the firing can easily proceed uniformly, making it possible to easily control the average particle size of the primary particles of the lithium composite compound to an appropriate range.

The pre-firing step S15 is a step of firing the mixture produced in the mixing step S10 at a firing a temperature of 200° C. or higher and 400° C. or lower for 0.5 hours or longer and 5 hours or shorter, thereby producing a fired precursor. The pre-firing step S15 is performed mainly for the purpose of removing moisture and the like that hinder the synthesis reaction of the lithium composite compound from the mixture produced in the mixing step S10. The pre-firing step S15 may be omitted depending on the type of starting material, firing conditions, and the like.

At the firing temperature being 200° C. or higher in the pre-firing step S15, combustion of impurities fully proceeds, and this successfully prevents an inert heterogeneous phase from being formed during subsequent firing. Meanwhile, at the firing temperature being 400° C. or lower, a crystal of the lithium composite compound is almost unlikely to be formed in this step, making it possible to avoid formation of a lower-purity crystal phase that otherwise can be formed in the presence of a gas containing moisture or impurities.

The firing temperature in the pre-firing step S15 is preferably 250° C. or higher and 400° C. or lower, and more preferably 250° C. or higher and 380° C. or lower. At the firing temperature controlled within such a range, it now become possible to efficiently remove moisture or impurities, and also to certainly prevent a crystal of lithium composite compound from being formed in this step. The firing time in the pre-firing step S15 can be determined properly, depending for example on the firing temperature, amounts of moisture and impurities in the mixture, target levels of removal of moisture and impurities, and a degree of crystallinity.

The pre-firing step S15 is preferably conducted under a flow of an atmospheric gas, or under an evacuation by a pump. Firing in such an atmosphere can efficiently exclude a gas with moisture and impurities out. A flow rate of an air flow of the atmospheric gas, and an emission volume per unit time by the pump may be set to be higher than a volume of a gas generated from the mixture. The volume of the gas generated from the mixture can be determined, for example, on the basis of an amount of consumption of the starting materials, or, a mole ratio of a component which is to be gasified by combustion or thermal decomposition relative to the starting material.

The pre-firing step S15 may be conducted in an oxidative gas atmosphere, or in a non-oxidative gas atmosphere, or in a reduced-pressure atmosphere. The oxidative gas atmosphere may be either an oxygen gas atmosphere or an air atmosphere. The reduced-pressure atmosphere may have a pressure equal to or less than an atmospheric pressure and may be a reduced-pressure atmosphere condition having an appropriate degree of a vacuum.

The firing step S20 includes two or more stages of controlling firing temperatures to different temperatures respectively. Note that, in FIG. 1, the firing step S20 includes a first firing step S21, a second firing step S22, and a third firing step S23, and as long as the firing temperature includes two or more stages in the range of 450° C. or higher, it is possible to optionally include a step of controlling the firing temperature to an appropriate temperature.

Among the two or more stages controlled to different firing temperatures, the stage where the firing temperature is on the lower side is performed mainly for the purpose of desorbing carbon dioxide. On the other hand, the stage where the firing temperature is on the higher side is performed mainly for the purpose of growing crystals of the lithium composite compound. In the firing step S20, the precursor produced through the mixing step S10, that is, the fired precursor (mixture) subjected to, after mixing, appropriate treatment such as washing, granulation drying, and pre-firing is performed in an atmosphere having a higher oxygen concentration and a lower carbon dioxide concentration to form a lithium composite compound having a layered structure.

In the firing step S20, that is, after the first firing step S21, it is preferable to perform firing in an atmosphere having an oxygen concentration of at least 45% or more and a carbon dioxide concentration of at least 0.02% or less. In addition, the firing temperature is controlled preferably in a range of at least 450° C. or higher and 900° C. or lower. Note that, in the firing stages, the firing temperature for each stage may be controlled to constant, or the firing temperature for each stage may be variably controlled within a predetermined temperature range.

Typical reactions when firing a lithium composite compound using lithium carbonate as a starting material include the following reaction formulae (I) and (II)

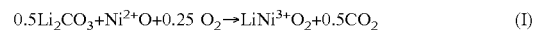

$$0.5Li_2CO_3 + Ni^{2+}O + 0.25\ O_2 \rightarrow LiNi^{3+}O_2 + 0.5CO_2 \quad (I)$$

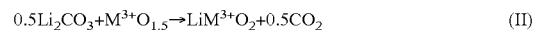

$$0.5Li_2CO_3 + M^{3+}O_{1.5} \rightarrow LiM^{3+}O_2 + 0.5CO_2 \quad (II)$$

provided that, in the formulae, M represents a transition metal such as Ni, Mn, or Co.

As presented in the above reaction formula (I), a higher oxygen partial pressure is required in the case of firing a lithium composite compound containing nickel for the purpose of exceeding the standard Gibbs energy of the reaction for sufficiently oxidizing nickel from stable divalent to trivalent to generate a crystal structure. Grain growth of the lithium composite compound by those reactions proceeds significantly at a temperature higher than around 770° C. However, as the firing temperature is higher, the crystal grains are more likely to be coarsened, so that the specific surface area becomes smaller and the performance such as charge-discharge capacity may deteriorate. Therefore, among the two or more stages controlled to different firing temperatures, the stage where the firing temperature is on the higher side is preferably performed in an atmosphere having a higher oxygen concentration for a short firing time.

In addition, as represented in the reaction formulae (I) and (II), when firing a lithium composite compound using lithium carbonate as a starting material, carbon dioxide is desorbed from lithium carbonate. When the carbon dioxide concentration in the atmosphere increases, the reaction between lithium carbonate and the nickel compound is greatly inhibited, and the amount of the carbonate component taken into the crystals of the lithium composite compound becomes significant. As a result, the performance such as charge-discharge capacity tends to deteriorate. The reaction of lithium carbonate involving the release of carbon dioxide starts at a temperature lower than near 700 to 720° C., and with a certain oxygen concentration, the reaction proceeds longer as the firing time is longer. Therefore, among the two or more stages controlled to different firing temperatures, the stage where the firing temperature is on the lower side can be performed even in an atmosphere having a relatively lower oxygen concentration.

Then, the firing step S20 performs firing while controlling, among the two or more stages controlled to different firing temperatures, the stage, where the firing temperature is controlled to a lower temperature, in an atmosphere with a lower oxygen concentration than the stage controlled to a higher temperature. In general, each atmosphere in the multi-stage firing is maintained at a higher oxygen concentration of 90% or more by continuously supplying oxygen gas or the like at each stage. On the other hand, the present embodiment can reduce the cost of supplying oxygen gas because the stage, where the firing temperature is controlled to a lower temperature, is controlled in an atmosphere having a lower oxygen concentration. At the stage where the firing temperature is on the lower side, that is, at the earlier stage of firing, it is possible to employ a longer firing time at the same heating cost as compared to the later stage. Therefore, even when the stage where the firing temperature is on the lower side is controlled in an atmosphere having a relatively lower oxygen concentration, it is possible to obtain a cathode active material with sufficiently advanced crystallization.

The firing step S20 preferably includes a stage where the firing temperature is controlled below 770° C., and a stage where the firing temperature is controlled to 770° C. or higher. Grain growth of the lithium composite compound significantly proceeds at a temperature higher than around 770° C. Therefore, when the multi-stage firing is performed with the temperature of 770° C. in between, carbon dioxide can be desorbed at the stage where the firing temperature is on the lower side. On the other hand, at the stage where the firing temperature is on the higher side, the growth of the crystals of the lithium composite compound can be allowed to proceed. Since the grains can be grown with most of the lithium carbonate desorbed, it is possible to prevent a situation where the carbon dioxide desorbed from lithium carbonate inhibits the growth of crystals of the lithium composite compound and generates an inert phase.

The firing step S20 more preferably includes a stage where the firing temperature is controlled below 720° C., a stage where the firing temperature is controlled to 720° C. or higher and below 770° C., and a stage where the firing temperature is controlled to 770° C. or higher. Since the reaction between lithium carbonate and the nickel compound starts at a temperature lower than about 700 to 720° C., multi-stage firing with the temperature of 720° C. in between makes it possible to sufficiently desorb carbon dioxide at the stage where the firing temperature is on the lower side. At the stage where the firing temperature is on the lower side, the required oxygen concentration is lower and the heating cost is also lower, so that the manufacturing cost of the cathode active material can be further reduced.

The firing step S20 controls, among the two or more stages controlled to different firing temperatures, the stage where the firing temperature is controlled below 720° C. preferably in an atmosphere having an oxygen concentration of 45% or more and 75% or less, and more preferably in an atmosphere having an oxygen concentration of 45% or more and less than 60%. When the oxygen concentration is within such a range, the required amount of oxygen gas is reduced even when the firing time is lengthened, so that the manufacturing cost of the cathode active material can be further reduced.

In addition, firing step S20 controls, among the two or more stages controlled to different firing temperatures, the stage where the firing temperature is controlled to 720° C. or higher and below 770° C. preferably in an atmosphere having an oxygen concentration of 55% or more and 85% or less, and more preferably in an atmosphere having an oxygen concentration of 60% or more and less than 80%. When the oxygen concentration is within such a range, carbon dioxide can be released into an atmosphere having a lower oxygen concentration and removed while growing crystals of the lithium composite compound. Therefore, the manufacturing cost of the cathode active material can be further reduced while effectively using oxygen.

In addition, firing step S20 controls, among the two or more stages controlled to different firing temperatures, the stage where the firing temperature is controlled to 770° C. or higher preferably in an atmosphere having an oxygen concentration of 80% or more and 100% or less, and more preferably in an atmosphere having an oxygen concentration of 80% or more and 93% or less. When the oxygen concentration is within such a range, crystals of the lithium composite compound grow in an atmosphere having a higher oxygen concentration, so that it is possible to fire a lithium composite compound having a higher crystal purity and a higher charge-discharge capacity.

Figure 2:
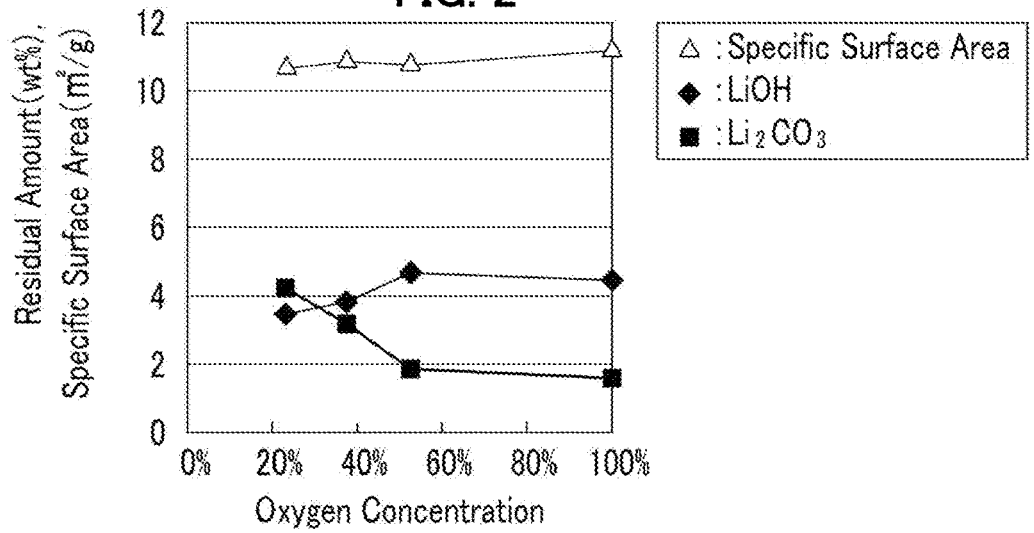
FIG. 2 is a diagram illustrating the relationship between the oxygen concentration of the atmosphere, the residual amount of lithium carbonate measured after firing, and the specific surface area of the fired object.
Figure 3:
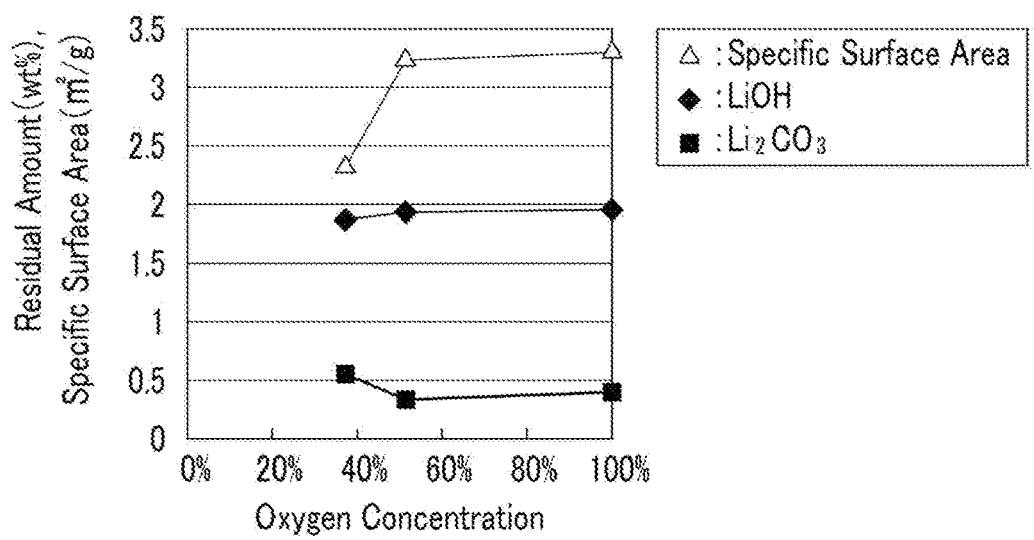
FIG. 3 is a diagram illustrating the relationship between the oxygen concentration of the atmosphere in the first stage firing, the residual amount of lithium carbonate measured after a later stage (second stage) firing, and the specific surface area of the fired object.
Figure 4:
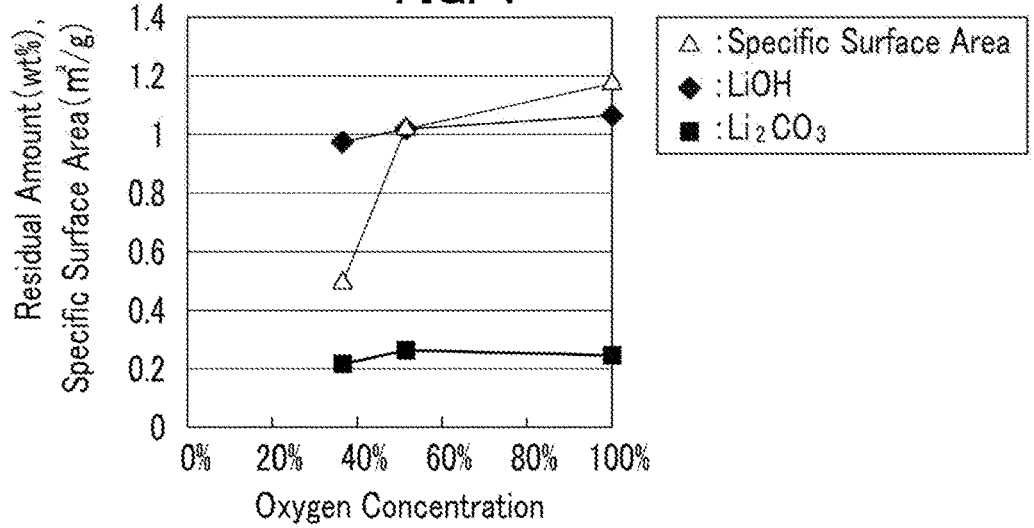
FIG. 4 is a diagram illustrating the relationship between the oxygen concentration of the atmosphere in the first stage firing, the residual amount of lithium carbonate measured after a later stage (third stage) firing, and the specific surface area of the fired object.

FIG. 2, FIG. 3, and FIG. 4 each are a diagram illustrating the relationship between the oxygen concentration of the atmosphere, the residual amount of lithium carbonate measured after firing, and the specific surface area of the fired object. FIG. 2, FIG. 3, and FIG. 4 each plot the measurement results of the residual amount of lithium carbonate ($Li_2CO_3$), the residual amount of lithium hydroxide (LiOH), and the BET specific surface area (SSA) of the fired object measured after firing of the stages included in the three-stage firing relative to the oxygen concentration in the atmosphere of the first stage firing. Note that lithium hydroxide is generated by the reaction between lithium and moisture in the atmosphere, and can cause gelation by modifying a binder such as PVDF at the time of manufacturing a cathode. Since the residual amount of lithium hydroxide indirectly indicates the rate of dissolution of $Li^+$ from the lithium composite compound into water, it is an index of soundness of the crystal surface.

Note that the first stage firing illustrated in FIG. 2 is performed with a firing temperature of 650° C., a firing time of 10 hours, and a changing oxygen concentration. The second stage firing illustrated in FIG. 3 is performed with a firing temperature of 755° C., a firing time of 2 hours, and an oxygen concentration of about 100%. The third stage firing illustrated in FIG. 4 is performed with a firing temperature of 825° C., a firing time of 2 hours, and an oxygen concentration of about 100%.

As illustrated in FIG. 2, in the first stage firing, there is a significant change in the residual amount of lithium carbonate relative to the oxygen concentration in the range where the oxygen concentration in the atmosphere is 37% to 50%. The residual amount of lithium carbonate increases when the oxygen concentration in the atmosphere is about 50% or less, and the residual amount is significant in the range where the oxygen concentration is less than about 45%. On the other hand, in the range where the oxygen concentration in the atmosphere is about 50% or more, the change in the residual amount relative to the oxygen concentration is small, and in the range where the oxygen concentration is about 45% or more, the residual amount is suppressed. Note that, with the decrease in lithium carbonate, the residual amount of lithium hydroxide slightly increases.

As illustrated in FIG. 3, in the second stage firing, the residual amount of lithium carbonate is larger and the specific surface area of the fired object is smaller when the oxygen concentration in the first stage atmosphere is 37% than when the oxygen concentration is 50%. On the other hand, in the range where the oxygen concentration in the first stage atmosphere is about 45% or more, the residual amount of lithium carbonate is suppressed, and the specific surface area of the fired object is kept large.

As illustrated in FIG. 4, in the third stage firing, the residual amount of lithium carbonate is substantially reduced regardless of the oxygen concentration in the first stage atmosphere. However, when the oxygen concentration in the first stage atmosphere is 37%, the specific surface area of the fired object is significantly small. On the other hand, when the oxygen concentration in the first stage atmosphere is about 45% or more, the specific surface area is substantially in an appropriate range.

As indicated by these results, when the oxygen concentration at the stage where the firing temperature is on the lower side, that is, at the earlier stage of firing, is maintained at a necessary concentration, the residual amount of lithium carbonate will be reduced in the subsequent firing stages. Therefore, when the amount of oxygen gas supplied at the earlier stage is reduced to the minimum necessary oxygen concentration, and the amount of oxygen gas supplied in the subsequent firing stages is reduced to an appropriate range, it is possible to fire a lithium composite compound having a higher crystal purity and a higher charge-discharge capacity while suppressing the manufacturing cost.

Moreover, oxygen gas is reused in order to suppress the manufacturing cost. Specifically, the firing step S20 may perform firing by introducing the gas discharged from the atmosphere of the stage where the firing temperature is controlled to a higher temperature, among the two or more stages controlled to different firing temperatures, into the atmosphere of the stage, where the firing temperature is controlled to a lower temperature. While the stage where the firing temperature is controlled to a higher temperature as described above requires a higher oxygen concentration, the stage, where the firing temperature is controlled to a lower temperature, needs only a lower oxygen concentration. In addition, a large amount of unreacted oxygen is discharged from the stage on the higher-temperature side requiring a higher oxygen concentration. Therefore, when the gas discharged from the stage where the firing temperature is on the higher side is introduced into the atmosphere on the lower-temperature side and reused, the stage on the lower-temperature side can be controlled to a lower oxygen concentration while reducing the total amount of oxygen gas supplied.

When the firing step S20 includes the stage where the firing temperature is controlled below 720° C., the stage where the firing temperature is controlled to 720° C. or higher and below 770° C., and the stage where the firing temperature is controlled to 770° C. or higher, it is preferable to perform firing by introducing the gas discharged from the atmosphere of the stage where the firing temperature is controlled to 770° C. or higher into the atmosphere of the at least one of the stage where the firing temperature is controlled below 720° C. and the stage where the firing temperature is controlled to 720° C. or higher and below 770° C. In addition, firing may be performed by introducing the gas discharged from the atmosphere of the stage where the firing temperature is controlled to 770° C. or higher and the gas discharged from the atmosphere of the stage where the firing temperature is controlled to 720° C. or higher and below 770° C. into the atmosphere of the stage where the firing temperature is controlled below 720° C. When gas is introduced in this manner, the firing time can be adjusted to significantly reduce the supply amount of oxygen gas supplied to the stage on the lower-temperature side.

Figure 5:
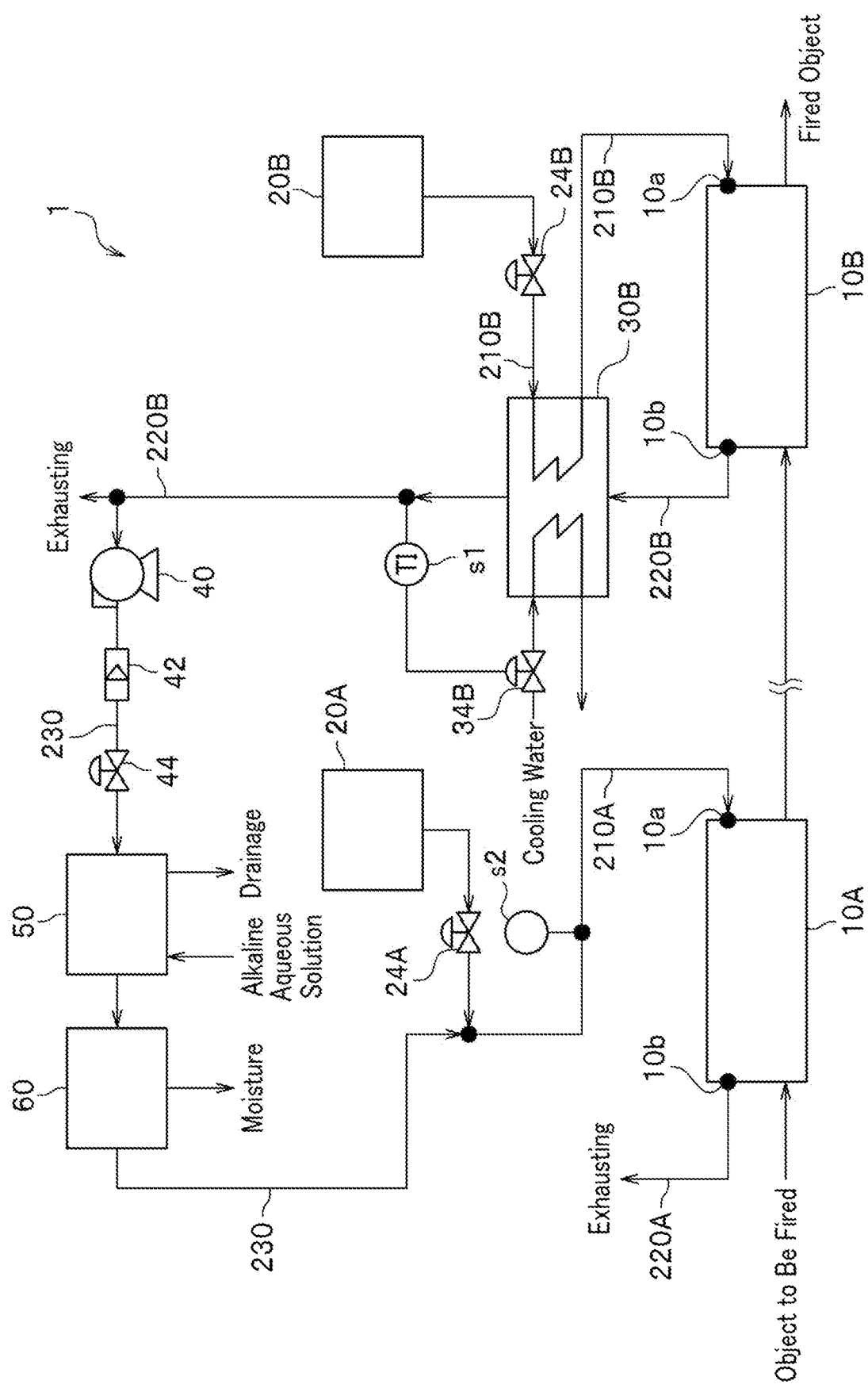
FIG. 5 is a diagram illustrating the configuration of a firing apparatus used for manufacturing a cathode active material for a lithium ion secondary battery.

FIG. 5 is a diagram illustrating the configuration of a firing apparatus used for manufacturing a cathode active material for a lithium ion secondary battery. The gas discharged from the stage where the firing temperature is controlled to a higher temperature can be used with a firing apparatus 1 as illustrated in FIG. 5. The firing apparatus 1 includes firing furnaces 10A and 10B, oxygen suppliers 20A and 20B, oxygen flow rate adjustment valves 24A and 24B, a heat exchanger 30B, a cooling water flow rate adjustment valve 34B, a blower 40, a flow rate sensor 42, a transfer flow rate adjustment valve 44, a carbon dioxide removal apparatus (carbon dioxide removal means) 50, a drying apparatus 60, a temperature sensor s1, and a carbon dioxide sensor s2.

The firing apparatus 1 includes a plurality of (two-stage) firing furnaces 10A and 10B for sequential and stepwise firing of precursors controlled to different firing temperatures and produced by mixing lithium carbonate and a compound containing a metal element other than Li in the above formula (1). In the firing apparatus 1, among the two or more stages controlled to different firing temperatures, the stage where the firing temperature is on the lower side is performed in the firing furnace 10A where the firing temperature is controlled to a relatively lower temperature. In addition, the stage where the firing temperature is on the higher side is performed in the firing furnace 10B where the firing temperature is controlled to a relatively higher temperature.

The firing furnaces 10A and 10B can be any of continuous type and batch type firing furnaces. The firing furnaces 10A and 10B may be any of continuous furnace and stationary furnace as long as in-furnace stirring by airflow and in-furnace atmosphere adjustment are possible, and may be of an appropriate system such as electric furnace, muffle furnace, atmospheric furnace, and high-frequency furnace.

Specifically, as the firing furnaces 10A and 10B, it is possible to use a rotary kiln, a roller-hearth kiln, a tunnel furnace, a pusher furnace, a belt furnace, a batch furnace, and the like. The firing furnace 10A is charged with a object to be fired (such as a mixture or a precursor), and the intermediate fired object is fired under an oxygen gas stream. Then, the firing furnace 10B is charged with the intermediate fired object produced on the lower-temperature side, and the fired object (such as the intermediate fired object or the lithium composite compound) is fired under an oxygen gas stream.

The firing furnaces 10A and 10B each are open to the furnace atmosphere, and have a gas inlet 10a through which gas flows into the furnace, and a gas outlet 10b which is open to the furnace atmosphere and discharges the gas inside the furnace to the outside of the furnace. The gas outlet 10b of the firing furnace 10B communicates with the outside of the system via a gas exhaust pipe 220B. On the other hand, the gas inlet 10a of the firing furnace 10B is connected to the oxygen supplier 20B via a gas supply pipe 210B. The oxygen supplier 20B supplies a higher-concentration oxygen gas to the firing furnace 10B, and the oxygen gas introduced from the gas inlet 10a forms an airflow in the firing furnace 10B. An oxygen flow rate adjustment valve 24B is provided downstream of the oxygen supplier 20B so as to control the flow rate of oxygen gas supplied to the firing furnace 10B.

As in the case of the firing furnace 10B, the firing furnace 10A is supplied with oxygen gas from the oxygen supplier 20A provided with the oxygen flow rate adjustment valve 24A via a gas supply pipe 210A.

In FIG. 5, the oxygen suppliers 20A and 20B are PSA (Pressure Swing Adsorption) type oxygen production apparatuses. When compressed air is introduced into the adsorption tower, the oxygen suppliers 20A and 20B generate higher-concentration oxygen gas (oxygen-nitrogen mixture gas) having a reduced concentration of nitrogen and the like. Then, the oxygen gas is pressurized to a predetermined discharge pressure and supplied to the gas supply pipes 210A and 210B. The oxygen supplier 20A and 20B preferably can supply an oxygen concentration of 90% or more, and more preferably supply an oxygen concentration of 92% or more. When the oxygen concentration is 90% or more, a necessary oxygen partial pressure in the firing furnace can be secured by an oxygen production apparatus having ordinary performance.

Note that the oxygen suppliers 20A and 20B may be, for example, other types of oxygen production apparatuses such as gas tanks, gas cylinders, and the like for storing oxygen gas as well VSA (Vacuum Swing Adsorption) type, PVSA (Pressure Vacuum Swing Adsorption) type, PTSA (Pressure Thermal Swing Adsorption) type, and gas separation membrane type. In addition, a blower or the like for supplying oxygen gas from the oxygen suppliers 20A and 20B to the firing furnaces 10A and 10B may be provided on the gas supply pipes 210A and 210B.

In addition, in FIG. 5, the oxygen suppliers 20A and 20B are provided to the respective firing furnaces 10A and 10B, and the configuration is such that the two-stage firing furnaces 10A and 10B are supplied with oxygen gas from the respective oxygen suppliers 20A and 20B. However, instead of such a configuration, a single oxygen supplier may be connected to the firing furnaces 10A and 10B. The oxygen concentration of the oxygen gas supplied to each of the firing furnaces 10A and 10B can be adjusted by individually mixing an inert gas such as nitrogen.

As illustrated in FIG. 5, a heat exchanger 30B is provided in the gas supply pipe 210B and the gas exhaust pipe 220B. The heat exchanger 30B has a higher heat side connected to the gas exhaust pipe 220B and a lower heat side connected to the gas supply pipe 210B. Provided downstream on the higher heat side of the heat exchanger 30B is a temperature sensor s1 for measuring the temperature of the gas that has undergone heat exchange.

The heat exchanger 30B is an appropriate heat exchanger such as a stationary type or a rotary type that performs gas-gas heat exchange. Note that, in FIG. 5, the heat exchanger 30B is configured to perform heat exchange with three fluids, and is supplied with cooling water in addition to the gas supplied through the gas supply pipe 210B and the gas discharged from the firing furnace 10B. The flow rate of the cooling water supplied to the heat exchanger 30B is adjusted to a predetermined flow rate by the cooling water flow rate adjustment valve 34B under the measurement by the temperature sensor s1.

The heat exchanger 30B performs heat exchange between the gas discharged from the firing furnace 10B and the gas supplied to the firing furnace 10B, and uses the exhaust heat of the gas discharged from the firing furnace 10B to heat the gas introduced into the firing furnace 10B. When such a heat exchanger 30B is provided, a temperature decrease in the firing furnace 10B due to the introduction of gas can be suppressed with high energy efficiency. When heat exchange is performed between the gas discharged from the firing furnace 10B and the cooling water, the gas exhausted from the heat exchanger 30B can be forcibly cooled to a temperature equal to or lower than the heat resistant temperature of the blower 40.

As illustrated in FIG. 5, a gas transfer pipe 230 is connected downstream of the heat exchanger 30B of the gas exhaust pipe 220B. The gas transfer pipe 230 communicates between the gas outlet 10b of the firing furnace 10B and the gas inlet 10a of the firing furnace 10A. A blower 40, a flow sensor 42, a return flow rate adjustment valve 44, a carbon dioxide removal apparatus 50, and a drying apparatus 60 are provided in this order in the middle of the gas transfer pipe 230. The other end of the gas transfer pipe 230 is connected to the gas supply pipe 210A.

The gas discharged from the firing furnace 10B flows through the gas transfer pipe 230 by the operation of the blower 40, is sent to the carbon dioxide removal apparatus 50 and the drying apparatus 60, and is then introduced into the firing furnace 10A. The flow rate of the gas sent to the firing furnace 10A is adjusted to a predetermined flow rate by the transfer flow rate adjustment valve 44 under the measurement of the flow rate sensor 42. The gas discharged from the firing furnace 10B contains a large amount of unreacted oxygen. Therefore, the gas discharged from the firing furnace 10B is mixed with the oxygen gas supplied from the oxygen supplier 20A at a predetermined flow rate ratio, and then is reused for in-furnace stirring and adjusting the furnace atmosphere of the firing furnace 10A.

The carbon dioxide removal apparatus 50 removes carbon dioxide contained in the gas discharged from the firing furnace. The gas discharged from the firing furnace 10B contains carbon dioxide desorbed from lithium carbonate or the like during firing. Providing the carbon dioxide removal apparatus 50 prevents a large amount of carbon dioxide from being transferred to the firing furnace 10A. Thus, it is possible to suppress a situation where the carbon dioxide inhibits the reaction between lithium carbonate and the nickel compound, and the carbonate component is taken into the crystals of the lithium composite compound. Therefore, even when the gas discharged from the firing furnace 10B is introduced into the firing furnace 10A at a higher mixing ratio, it is possible to fire a lithium composite compound having a higher crystal purity and a higher charge-discharge capacity.

In FIG. 5, the carbon dioxide removal apparatus 50 is a chemical absorption type wet cleaning apparatus which removes carbon dioxide by bringing a gas into contact with an aqueous solution of an alkaline compound (alkaline aqueous solution). The gas discharged from the firing furnace 10B is passed through the aqueous solution of an alkaline compound, and carbon dioxide is captured by a neutralization reaction with the alkaline compound. With such a configuration, it is possible to more reliably prevent the gas containing carbon dioxide from being sent to the firing furnace 10A.

As the alkaline compound, various compounds such as sodium hydroxide, potassium hydroxide, and calcium hydroxide can be used. Among these, sodium hydroxide is particularly preferable from the viewpoint of cost reduction and the fact that it can be used after separation and recovery as an impurity from e.g. a starting material containing nickel. Note that, as the carbon dioxide removal apparatus 50, it is possible to use, in addition to a chemical absorption type, other apparatuses such as a physical absorption type which allows a solution of polyethylene glycol, ether, or the like to absorb carbon dioxide, an adsorption type which allows an adsorbent such as zeolite to adsorb carbon dioxide, and a gas separation membrane type which separates carbon dioxide by the principle of membrane separation.

The drying apparatus 60 removes moisture contained in the gas discharged from the carbon dioxide removal apparatus 50. In the case of using a chemical absorption type carbon dioxide removal apparatus 50 using an aqueous solution, or in the case of using a hydroxide or the like as a starting material, the gas discharged from the firing furnace 10B may contain moisture. When a gas containing moisture is introduced into the firing furnace 10A, the moisture may react with lithium to generate an alkali compound, or moisture may be taken into the crystals of the lithium composite compound. This results in the generation of an electrochemically inert heterogeneous phase and the deterioration of the electrolyte solution included in the battery. On the other hand, when the drying apparatus 60 is provided, the transfer of moisture to the firing furnace 10A is prevented. Therefore, even when the gas discharged from the firing furnace 10B is introduced into the firing furnace 10A at a higher mixing ratio, it is possible to obtain a lithium composite compound having a higher crystal purity and a higher charge-discharge capacity and hardly deteriorating the electrolytic solution.

As the drying apparatus 60, it is possible to use, for example, an appropriate apparatus such as an adsorption type which allows an adsorbent such as silica gel to adsorb moisture, a refrigeration type which cools gas to lower temperature to separate condensed water, a heating type which heats gas to vaporize moisture, or a separation membrane type which separates moisture by the principle of membrane separation. Note that, in the case of using a starting material from which moisture is not desorbed, or in the case of using a dry apparatus as the carbon dioxide removal apparatus 50, the installation of the drying apparatus 60 may be omitted.

The carbon dioxide sensor s2 is installed downstream of the junction of the gas supply pipe 210A and the gas transfer pipe 230, and is arranged to detect the carbon dioxide concentration at the gas inlet 10a of the firing furnace 10A. The gas discharged from the firing furnace 10B and treated by the carbon dioxide removal apparatus 50 is mixed with oxygen gas as necessary, and then is detected in terms of the concentration of carbon dioxide. If the blower 40 is stopped when the carbon dioxide concentration exceeds a threshold value with the carbon dioxide sensor s2 installed, it is possible to prevent unremoved carbon dioxide from flowing into the firing furnace 10A.

Next, description is provided for a method for controlling the firing atmosphere in the firing apparatus 1.

The firing apparatus 1 charges the object to be fired into the firing furnace 10A, performs firing of the stage where the firing temperature is on the lower side, charges the fired object produced in the firing furnace 10A into the firing furnace 10B, and performs firing of the stage where the firing temperature is on the higher side. First, the firing furnaces 10A and 10B are supplied with an oxygen gas from the oxygen suppliers 20A and 20B. The flow rate of the oxygen gas can be adjusted according to the types of the firing furnaces 10A and 10B, the structures and shapes of the firing furnaces 10A and 10B, the amount of the precursor to be charged into the firing furnaces 10A and 10B, and the like. Supplying of oxygen gas maintains the furnace atmosphere under an airflow having a higher oxygen concentration within a range where the oxygen concentration is at least 45% or more, and the object to be fired is fired. Then, unreacted oxygen and carbon dioxide desorbed from lithium carbonate are exhausted from the firing furnaces 10A and 10B.

In the firing apparatus 1, during the firing by supplying the oxygen gas, it is possible to operate the blower 40 according to the oxygen concentration of the supplied oxygen gas, the furnace atmosphere of the firing furnaces 10A and 10B, and the like. When the blower 40 is operated with the transfer flow rate adjustment valve 44 opened to a predetermined degree, the gas discharged from the firing furnace 10B is sent to the carbon dioxide removal apparatus 50 and the drying apparatus 60 for removal of carbon dioxide and moisture, then mixed with oxygen gas at a predetermined flow rate ratio, and introduced into the firing furnace 10A.

In the firing apparatus 1, it is preferable that the gas discharged from the firing furnace 10B be subjected to adjustment of carbon dioxide concentration to 0.02% or less, and then introduced into the atmosphere of the firing furnace 10A in which the firing temperature is controlled to a lower temperature. When a gas having a higher carbon dioxide concentration is introduced, there may be a situation where the reaction of lithium carbonate or nickel is inhibited, or a carbonate component is taken into the crystals of the lithium composite compound. However, if the carbon dioxide concentration is reduced to 0.02% or less, it is possible to more reliably fire a lithium composite compound having a higher crystal purity and a higher charge-discharge capacity.

The configuration of the firing apparatus 1 described above may be applied to any of the two or more stages controlled to different firing temperatures. For example, in the case of performing three-stage firing, the configuration may be such that the gas discharged from the third firing furnace is transferred to the second, the configuration may be such that the gas discharged from the third firing furnace is transferred to the first, or the configuration may be such that the gas discharged from the second firing furnace is transferred to the first. In addition, the configuration may be such that the gas is sequentially transferred from the stage where the firing temperature is on the higher side to the stage where the firing temperature is on the lower side.

Note that the target concentration value of each gas is specified on the assumption that it is under atmospheric pressure, but the furnace atmosphere of the firing furnaces 10A and 10B may be controlled to atmospheric pressure as well as may be controlled to positive pressure, or may be controlled to negative pressure. When the furnace atmosphere is controlled to positive pressure, it is possible to prevent unintended inflow of gas into the firing furnaces 10A and 10B and backflow of discharged gas. In addition, the configuration of the firing apparatus 1 described above may be changed according to the number of firing stages to be applied, the firing conditions, and the like. For example, when the concentration of carbon dioxide contained in the discharged gas is lower, the installation of the carbon dioxide removal apparatus 50 and the drying apparatus 60 may be omitted, and the gas may be transferred only through the gas transfer pipe 230. The carbon dioxide concentration of the gas discharged from the firing furnace 10B may be reduced by dilution due to mixing with oxygen gas or the like, instead of the carbon dioxide removal apparatus 50 which reduces the carbon dioxide concentration by removing carbon dioxide. In addition, different systems and types of firing furnaces may be used in combination in each firing stage.

In addition, the oxygen concentration and carbon dioxide concentration to be controlled can be measured at the entrances of the firing furnaces (10A, 10B) used at the stages, for example, at the entrance of the firing furnace or on a gas line connected to firing furnace. The measurement position may be provided at one location or at multiple locations for each firing furnace. Alternatively, in some of the firing furnaces, measurement is not carried out but the concentration predicted/estimated based on the flow rate of gas or the amount of precursor may be used as the control target. For example, when the gas discharged from the firing furnace at a firing temperature on the higher-temperature side is supplied to the firing furnace at a firing temperature on the lower-temperature side, the concentration at the outlet of the firing furnace on the higher-temperature side and the concentration at the inlet of the firing furnace on the lower-temperature side are considered the same, and the measurement at any of them may be omitted.

In addition, the measurement of the oxygen concentration or carbon dioxide concentration may be carried out continuously online, or may be carried out intermittently online or by sampling. For the measurement of the oxygen concentration or carbon dioxide concentration, it is possible to use a concentration meter or gas sensor using various generally used principles. The oxygen concentration and carbon dioxide concentration can be measured by cooling the gas in the atmosphere to room temperature as necessary.

As illustrated in FIG. 1, the firing step S20 can be configured to include the first firing step S21, the second firing step S22, and the third firing step S23. The firing step S20 illustrated in FIG. 1 includes three stages of firing steps (S21, S22, S23) involving crystal growth in a firing temperature range of 450° C. or higher. Such multi-stage firing is particularly preferably used in the case of e.g. firing a cathode active material having a nickel content exceeding 60 to 70%.

The first firing step S21 is a step of firing the precursor produced by mixing lithium carbonate and a compound containing a metal element other than Li in the above formula (1) at a firing temperature of 450° C. or higher and below 720° C. to obtain a first intermediate fired object. The first firing step S21 is performed mainly for the purpose of oxidizing the precursor, starting the reaction of lithium carbonate, and desorbing impurities such as carbon dioxide.

In the first firing step S21, at the firing temperature being 450° C. or higher, desorption of impurities such as carbon dioxide starts, so that a large amount of lithium carbonate or the like can be prevented from remaining thereafter. For this reason, it becomes difficult for the lithium carbonate to form a liquid phase during the subsequent firing, which suppresses the coarsening of crystal grains. As a result, a cathode active material having a higher charge-discharge capacity is obtained. In addition, at the firing temperature being lower than 720° C., the formation of crystals of the lithium composite compound in the presence of impurities is suppressed, so that a cathode active material having a higher charge-discharge capacity is obtained.

The firing temperature in the first firing step S21 is preferably 550° C. or higher, more preferably 600° C. or higher, and further preferably 650° C. or higher. The higher the firing temperature is, the more the reaction of lithium carbonate is promoted, and the more reliably the residual lithium carbonate is prevented. In particular, when manganese is subjected to elemental substitution as the element represented by M2 in the formula (2), the firing temperature is preferably set to 600° C. or higher when the coefficient "1-x-y-z" for manganese is greater than 0 and less than 0.075. On the other hand, when the coefficient "1-x-y-z" for manganese is 0.075 or more, the reaction temperature is lowered, so the firing temperature may be set to 550° C. or higher.

The firing temperature in the first firing step S21 is preferably lower than 720° C., more preferably 700° C. or lower, and further preferably 680° C. or lower. The lower the firing temperature is, the more the growth of crystals of the lithium composite compound is suppressed. Therefore, the formation of crystals of the lithium composite compound in the presence of impurities is suppressed, and the charge-discharge capacity of the cathode active material is increased. In addition, since lithium carbonate is hardly melted and a liquid phase is hardly formed, the coarsening of crystal grains can be more reliably suppressed.

The firing time in the first firing step S21 is preferably 0.5 hours or longer and 50 hours or shorter, and more preferably 2 hours or longer and 15 hours or shorter. When the firing time is within this range, the reaction of lithium carbonate sufficiently proceeds, making it possible to reliably remove a large amount of carbonate component. Also a necessary time for firing is shortened, so that the productivity of cathode active material can be improved.

The first firing step S21 is performed under a gas flow such that the atmosphere has an oxygen concentration of 45% or more and 75% or less and a carbon dioxide concentration of 0.02% (200 ppm) or less. When the oxygen concentration is lower and the carbon dioxide concentration is higher in the atmosphere, the reaction between lithium carbonate and the nickel compound does not proceed, and a large amount of lithium carbonate remains in this step. Therefore, during the subsequent firing, lithium carbonate forms a liquid phase, and the crystal grains tend to become coarse. On the other hand, when the atmosphere has an oxygen concentration of 45% or more and a carbon dioxide concentration of 0.02% or less, the specific surface area of the lithium composite compound is increased, making it possible to obtain a cathode active material having a higher charge-discharge capacity.

The second firing step S22 is a step of firing the first intermediate fired object produced in the first firing step S21 at a firing temperature of 720° C. or higher and lower than 770° C. to obtain a second intermediate fired object. The second firing step S22 is performed mainly for the purpose of oxidizing nickel and sufficiently desorbing carbon dioxide by a reaction between lithium carbonate and nickel.

In the second firing step S22, at the firing temperature being 720° C. or higher, the reaction of lithium carbonate proceeds, and carbon dioxide is sufficiently desorbed, so that it is possible to prevent lithium carbonate from remaining after firing. For this reason, it becomes difficult for the lithium carbonate to forma liquid phase during the subsequent firing, which suppresses the coarsening of crystal grains. As a result, a cathode active material having a higher charge-discharge capacity is obtained. In addition, since the intake of the carbonate component into the crystals of the lithium composite compound is suppressed, it is possible to obtain a lithium composite compound having a higher crystal purity and a higher charge-discharge capacity. In addition, at the firing temperature being lower than 770° C., the growth of the crystals of the lithium composite compound in the presence of carbon dioxide or the like is suppressed. Therefore, it is possible to obtain a lithium composite compound having a higher crystal purity, whose coarsening of primary particles is suppressed, and exhibiting a higher charge-discharge capacity.

The firing temperature in the second firing step S22 is preferably 740° C. or higher. The higher the firing temperature is, the more the reaction of lithium carbonate is promoted, and the more reliably the residual carbon dioxide is prevented.

The firing temperature in the second firing step S22 is preferably 760° C. or lower. The lower the firing temperature is, the more the growth of crystals of the lithium composite compound is suppressed. Therefore, the formation of crystals of the lithium composite compound in the presence of carbon dioxide or the like is suppressed, and the charge-discharge capacity of the cathode active material is increased.

The firing time in the second firing step S22 is preferably 0.5 hours or longer and 15 hours or shorter. When the firing time is within this range, the reaction of lithium carbonate sufficiently proceeds, making it possible to reliably remove carbon dioxide. Also a necessary time for firing is shortened, so that the productivity of cathode active material can be improved.

The second firing step S22 is performed under a gas flow such that the atmosphere has an oxygen concentration of 55% or more and 85% or less and a carbon dioxide concentration of 0.02% (200 ppm) or less. The oxygen concentration in the second firing step S22 is preferably 60% or more. In addition, the carbon dioxide concentration is more preferably 0.01% or less.

The third firing step S23 is a step of firing the second intermediate fired object produced in the second firing step S22 at a firing temperature of 770° C. or higher and 900° C. or lower to obtain a lithium composite compound. The third firing step S23 is performed mainly for the purpose of sufficiently oxidizing nickel from divalent to trivalent and growing crystal grains of the lithium composite compound having a layered structure to an appropriate size.

In the third firing step S23, at the firing temperature being 770° C. or higher, it is possible to sufficiently oxidize nickel to obtain a lithium composite compound having a higher charge-discharge capacity. In addition, at the firing temperature being 900° C. or lower, lithium becomes less volatile, and the decomposition of the lithium composite compound having a layered structure is suppressed. Therefore, it is possible to avoid a decrease in the purity of the crystals obtained after firing.

The firing temperature in the third firing step S23 is preferably 800° C. or higher, more preferably 820° C. or higher, and further preferably 840° C. or higher. The higher the firing temperature is, the more reliably nickel is oxidized, making it possible to promote the grain growth of the lithium composite compound.

The firing temperature in the third firing step S23 is preferably 890° C. or lower. The lower the firing temperature is, the less likely lithium vaporizes, making it possible to more reliably prevent the decomposition of the lithium composite compound having a layered structure.

The firing time in the third firing step S23 is preferably 0.5 hours or longer and 15 hours or shorter. When the firing time is within this range, nickel can be sufficiently oxidized, making it possible to obtain a lithium composite compound having a higher crystal purity and a higher charge-discharge capacity. Also a necessary time for firing is shortened, so that the productivity of cathode active material can be improved.

The third firing step S23 is performed under a gas flow such that the atmosphere has an oxygen concentration of 80% or more and 100% or less and a carbon dioxide concentration of 0.02% (200 ppm) or less. The oxygen concentration in the third firing step S23 is preferably 80% or more, and more preferably 90% or more. In addition, the carbon dioxide concentration is more preferably 0.01% or less.

According to the above manufacturing method, adjustment of the firing time and the like in the first firing step makes it possible to exclude most of the impurities such as carbon dioxide, desorbed from the starting material such as lithium carbonate, from the atmosphere while saving oxygen. In addition, adjustment of the conditions of the second firing step and the third firing step makes it possible to efficiently promote the crystal generation and grain growth of the lithium composite compound while shortening the firing time and saving oxygen. Therefore, by performing firing while suppressing the manufacturing cost, it is possible to manufacture a cathode active material for a lithium ion secondary battery having a higher crystal purity and a higher charge-discharge capacity.

<Lithium Ion Secondary Battery>

Next, a lithium ion secondary battery, whose cathode comprising the cathode active material used for a lithium ion secondary battery, will be explained below.

Figure 6:
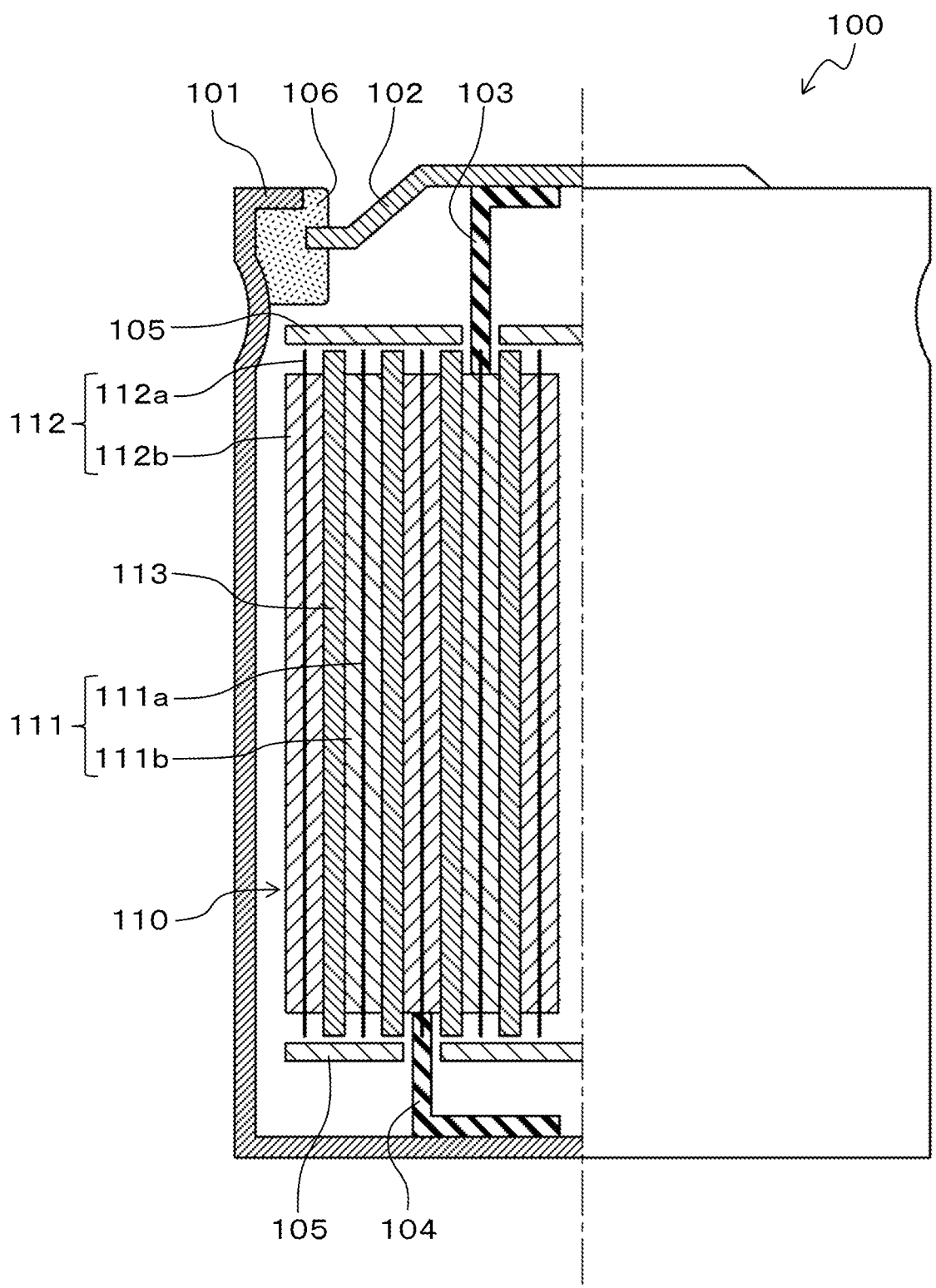
FIG. 6 is a partial cross-sectional view schematically illustrating an example of the lithium ion secondary battery.

FIG. 6 is a partial cross-sectional view schematically illustrating an exemplary lithium ion secondary battery. As illustrated in FIG. 6, a lithium ion secondary battery 100 according to the embodiment has a bottomed cylindrical battery can 101 that houses a nonaqueous electrolyte solution, a rolled electrode group 110 housed in the battery can 101, and a disk-like battery cover 102 that seals a top opening of the battery can 101.

The battery can 101 and battery cover 102 are typically made of a metal material such as stainless steel or aluminum. A cathode 111 has a cathode collector 111a, and a cathode mixture layer 111b formed on a surface of the cathode collector 111a. An anode 112 has an anode collector 112a, and an anode mixture layer 112b formed on a surface of the anode collector 112a.

The cathode collector 111a is typically made of metal foil, expanded metal or perforated metal, made of aluminum, an aluminum alloy or the like. The metal foil can have a thickness of approximately 15 μm or thicker and 25 μm or thinner, for example. The cathode mixture layer 111b contains a cathode active material used for a lithium ion secondary battery. The cathode mixture layer 111b is typically composed of a cathode mixture produced by mixing the cathode active material, a conductive material, a binder, and so forth.

The anode collector 112a is typically made of metal foil, expanded metal or perforated metal, made of copper, a copper alloy, nickel, a nickel alloy or the like. The metal foil may have a thickness of approximately 7 μm or thicker and 10 μm or thinner, for example. The anode mixture layer 112b contains an anode active material used for a lithium ion secondary battery. The anode mixture layer 112b is composed of an anode mixture produced by mixing the anode active material, a conductive material, a binder and so forth.

The anode active material employable here can be any of appropriate types of those having been used for an ordinary lithium ion secondary battery. Specific examples of the anode active material include natural graphite; graphitizable materials derived from petroleum coke, pitch coke and so forth, and fired at higher temperatures such as 2500° C. or above; mesophase carbon; amorphous carbon; graphite covered with amorphous carbon; carbon materials derived from natural graphite or artificial graphite, with the surface mechanically processed to degrade the crystallinity; carbon materials having organic substance such as polymer, covering on or adhering to the surface; a carbon fiber; metal lithium; alloys of lithium with aluminum, tin, silicon, indium, gallium or magnesium; materials composed of a silicon particle or a carbon particle having metal immobilized on its surface; and oxides of tin, silicon, lithium and titanium. Metals to be immobilized are, for example, lithium, aluminum, tin, indium, gallium, magnesium, and alloys of these metals.

The conductive material may be any of appropriate types of those having been used for an ordinary lithium ion secondary battery. Specific examples of the conductive material include a carbon particle of graphite, acetylene black, furnace black, thermal black, and channel black; and a carbon fiber such as pitch-based and polyacrylonitrile (PAN)-based ones. A single type of these conductive materials may be used independently, or two or more types may be used in a combined manner. An amount of the conductive material can typically be 3% by mass or more and 10% by mass or less, relative to the whole mixture.

The binder may be any of appropriate types of those having been used for an ordinary lithium ion secondary battery. Specific examples of the binder include polyvinylidene fluoride (PVDF), polytetrafluoroethylene, polyhexafluoropropylene, styrene-butadiene rubber, polyacrylonitrile, and modified polyacrylonitrile. A single type of these binders may be used independently, or two or more types may be used in a combined manner. Additionally, a thickening binder such as carboxymethyl cellulose may be used in a combined manner. An amount of the binder can be 2% by mass or more and 10% by mass or less, relative to the whole mixture, for example.

The cathode 111 and the anode 112 may be, for example, manufactured according to any of generally used methods for manufacturing electrodes for an ordinary lithium ion secondary battery. The electrodes may be manufactured, for example, through a mixture preparation step in which an active material, a conductive material, and a binder are mixed in a solvent to prepare an electrode mixture; a mixture coating step in which the thus prepared electrode mixture is coated over a substrate such as a current collector, and then dried to form an electrode mixture layer; and a molding step in which the electrode mixture layer is to be press molded.

A mixing means for mixing the materials in the mixture preparation step, employable is appropriate mixing apparatuses such as a planetary mixer, a disper mixer, and a rotation-revolution mixer. As the solvent, depending on the kind of a binder can be, for example, N-methylpyrrolidone, water, N,N-dimethylformamide, N,N-dimethylacetamide, methanol, ethanol, propanol, isopropanol, ethylene glycol, diethylene glycol, glycerin, dimethyl sulfoxide, tetrahydrofuran, and the like can be used.

As means for coating the thus produced slurry-like electrode mixture in the mixture coating step, employable are appropriate coating apparatuses such as a bar coater, a doctor blade, and a roll transfer machine. A means for drying the thus coated electrode mixture, employable is appropriate drying apparatuses such as a hot air heater and a radiation heater.

A means for pressure molding the electrode mixture layer in the molding step, employable is appropriate pressure apparatuses such as a roll press. The cathode mixture layer 111b can have a thickness of, for example, approximately 100 μm or thicker and 300 μm or thinner. On the other hand, the anode mixture layer 112b may typically have a thickness of, for example, approximately 20 μm or thicker and 150 μm or thinner. The pressure molded electrode mixture layer may be cut, as necessary, together with the cathode collector, to obtain an electrode for a lithium ion secondary battery with a desired shape.

The rolled electrode group 110 is formed, as illustrated in FIG. 6, by rolling up the strip-like cathode 111 and the anode 112, while placing a separator 113 in between. The rolled electrode group 110 is typically wound around a core made of polypropylene, polyphenylene sulfide or the like, and housed inside the battery can 101.

As the separator 113, employable are microporous films made of polyolefin resins such as polyethylene, polypropylene, and polyethylene-polypropylene copolymer, a polyamide resin, and an aramid resin; and these microporous films with a heat resistant substance such as an alumina particle coated on their surfaces.

As illustrated in FIG. 6, the cathode collector 111a is electrically connected through a cathode lead tab 103 to the battery cover 102. Meanwhile, the anode collector 112a is electrically connected through a anode lead tab 104 to the bottom of the battery can 101. Individually between the rolled electrode group 110 and the battery cover 102, and, between the rolled electrode group 110 and the bottom of the battery can 101, there are disposed insulation plates 105 to prevent short circuit. The cathode lead tab 103 and the anode lead tab 104 are made of materials same as those for the cathode collector 111a and the anode collector 112a, respectively, and are respectively joined to the cathode collector 111a and the anode collector 112a, by spot welding, ultrasonic welding or the like.

A nonaqueous electrolyte solution is injected into the battery can 101. The nonaqueous electrolyte solution may be injected by a method according to which the solution is directly injected, with the battery cover 102 kept open, or by a method according to which the solution is injected through an injection port provided to the battery cover 102, with the battery cover 102 kept closed. The battery can 101 is closed by the battery cover 102 fitted thereto typically by caulking. A sealant 106 made of an insulating resin material is placed between the battery can 101 and the battery cover 102, so as to electrically isolate the battery can 101 and the battery cover 102.

The nonaqueous electrolyte solution contains an electrolyte and a nonaqueous solvent. For the electrolyte, employable are, for example, various types of lithium salt such as LiPF6, LiBF4 and LiClO4. For the nonaqueous solvent, employable are, for example, chain carbonates such as dimethyl carbonate, diethyl carbonate, and ethyl methyl carbonate; cyclic carbonates such as ethylene carbonate, propylene carbonate, and vinylene carbonate; chain carboxylic esters such as methyl acetate, ethyl methyl carbonate, and methyl propyl carbonate; cyclic carboxylic esters such as γ-butyrolactone, and γ-valerolactone; and ethers. Concentration of the electrolyte can be, for example, typically 0.6 M or greater and 1.8 M or less.

The nonaqueous electrolyte solution may contain various additives added thereto, for the purpose of inhibiting oxidative decomposition or reductive decomposition of the electrolyte solution, preventing deposition of metal elements, improving ionic conductivity, or improving flame retardancy. Such additives are exemplified by organophosphorus compounds such as trimethyl phosphate, and trimethyl phosphite; organosulfur compounds such as 1,3-propanesultone, and 1,4-butanesultone; carboxylic anhydrides such as polyadipic anhydride and hexahydrophthalic anhydride; and boron compounds such as trimethyl borate, and lithium bis(oxalato)borate.

The thus assembled lithium ion secondary battery 100 uses the battery cover 102 as a cathode external terminal, and the bottom of the battery can 101 as an anode external terminal, and can thereby store externally fed electric power in the rolled electrode group 110. The lithium ion secondary battery 100 also can supply the electric power stored in the rolled electrode group 110 to external devices and so forth. The lithium ion secondary battery 100, although illustrated here as being cylindrical, is not specifically limited regarding a shape, instead allowing for other appropriate shapes including square, button, laminated sheet, and the like.

The lithium ion secondary battery 100 is applicable to various applications such as small-sized power sources for mobile electronic devices and home electric appliances; stationary power sources such as power storage device, uninterruptible power supply, and power leveling device, as well as driving power sources for vessels, railway vehicles, hybrid railway vehicles, hybrid cars, and electric cars.

Examples

The present invention will be described specifically, referring to embodiment examples, without limiting a technical scope of the present invention.

[Manufacturing Method 1: Samples 1 to 8]

A cathode active material was manufactured by a manufacturing method without reusing gas discharged from the atmosphere at each stage of firing. The firing was performed in three stages, and the oxygen concentration of the atmosphere at each stage was changed to manufacture the cathode active materials according to samples 1 to 8.

The lithium composite compound was synthesized according to the following procedure. First, lithium carbonate, nickel hydroxide, cobalt carbonate, and manganese carbonate were prepared as starting materials. Next, the starting materials were weighed so as to adjust the atomic ratio of Li:Ni:Co:Mn to 1.04:0.80:0.10:0.10, and were ground with a grinder and wet mixed to prepare a slurry. The produced slurry was granulated and dried with a spray dryer to obtain a mixed powder (mixing step).

Subsequently, 300 g of the mixed powder was filled into an alumina container having a length of 300 mm, a width of 300 mm, and a height of 100 mm, and fired using a continuous transfer furnace to obtain a fired powder of a lithium composite compound (firing step). Specifically, the mixed powder produced by granulating and drying the starting material was fired at 350° C. for 2 hours in the air to obtain a fired precursor (pre-firing step). Next, the fired precursor dehydrated by firing was fired at 650° C. for 10 hours in an oxygen stream to obtain a first intermediate fired object (precursor 1) (first firing step). Then, the first intermediate fired object was fired at 755° C. for 2 hours in an oxygen stream to obtain a second intermediate fired object (precursor 2) (second firing step). Thereafter, the second intermediate fired object was fired at 820° C. for 2 hours in an oxygen stream to obtain a lithium composite compound (fired powder) (third firing step). Note that table 1 presents the oxygen concentration of the atmosphere. The produced fired powder was classified to a mesh of 53 μm or less, and then subjected to subsequent measurement as a cathode active material.

Figure 7:
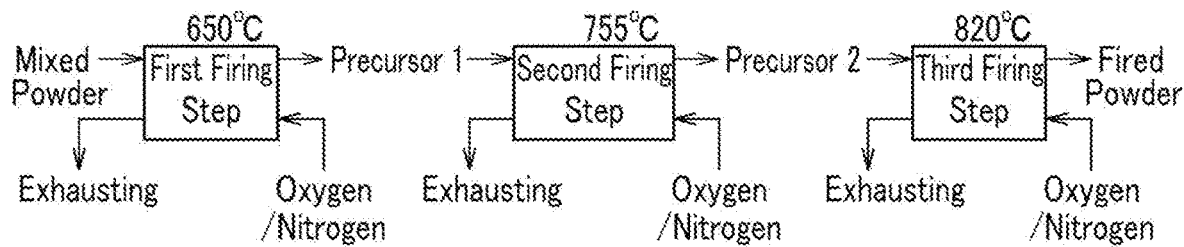
FIG. 7 is a schematic diagram illustrating an overview of the firing steps in Manufacturing Method 1.

FIG. 7 is a schematic diagram illustrating an overview of the firing steps in Manufacturing Method 1. As illustrated in FIG. 7, Manufacturing Method 1 supplied an oxygen-nitrogen mixture gas having a predetermined oxygen concentration to the continuous transfer furnace at each stage, and exhausted all the gas discharged from the atmosphere at each stage to the outside without reusing. Note that the pressure of the atmosphere in all continuous transfer furnaces was controlled to a slightly positive pressure of about 10 Pa as a gauge pressure.

Note that, in Manufacturing Method 1, the oxygen concentration was controlled as follows. An oxygen gas supply system provided with a flow rate meter and a nitrogen gas supply system provided with a flow rate meter were provided upstream of the continuous transfer furnace at each stage. In addition, a zirconia type oxygen concentration meter (LC-860, manufactured by Toray Engineering Co., Ltd.) was provided on the line after mixing the oxygen gas and the nitrogen gas. The continuous transfer furnace at each stage was supplied with the oxygen gas and the nitrogen gas whose flow rates were controlled while measuring the flow rates online with the flow rate meters so as to have predetermined flow rate ratios. Then, on the line after mixing the oxygen gas and the nitrogen gas, it was confirmed that the oxygen concentration on the inlet side of the continuous transfer furnace at each stage was the oxygen concentration presented in Table 1. During firing in each continuous transfer furnace, the oxygen-nitrogen mixture gas in the furnace was sampled at predetermined time intervals, and it was confirmed that the oxygen concentration was one presented in Table 1.

[Manufacturing Method 2: Sample 9]

The cathode active material was manufactured by a manufacturing method which performs firing while controlling, among the two or more stages controlled to different firing temperatures, the stage, where the firing temperature is controlled to a lower temperature, in an atmosphere with a lower oxygen concentration than the stage controlled to a higher temperature. The firing was performed in three stages, and the cathode active material according to sample 9 was manufactured as a configuration of transferring the gas discharged from the third-stage continuous transfer furnace to the first-stage. Note that the manufacturing conditions were the same as those of Manufacturing Method 1.

Figure 8:
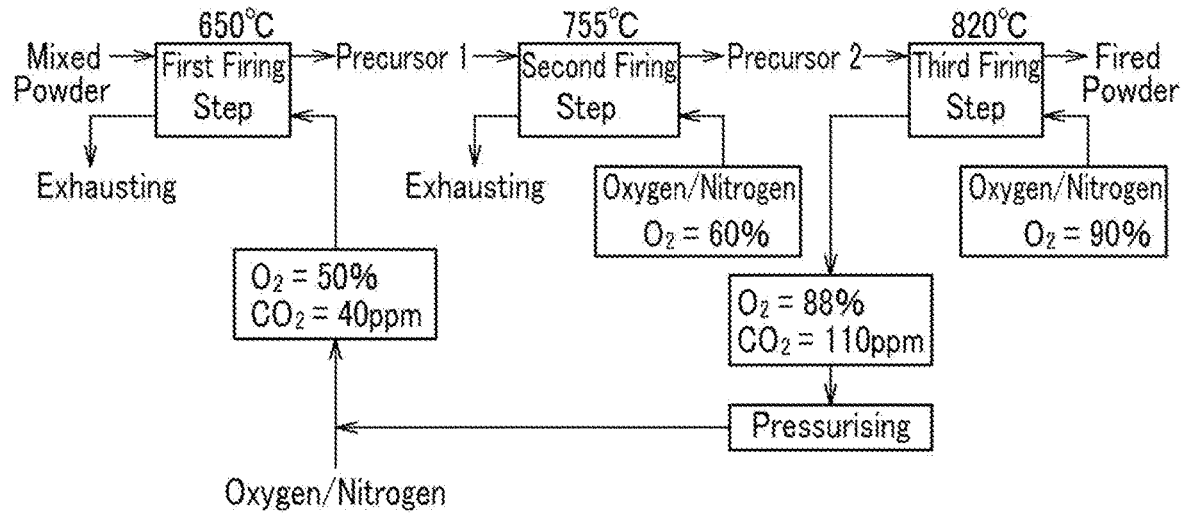
FIG. 8 is a schematic diagram illustrating an overview of the firing steps in Manufacturing Method 2.

FIG. 8 is a schematic diagram illustrating an overview of the firing steps in Manufacturing Method 2. As illustrated in FIG. 8, Manufacturing Method 2 supplied an oxygen-nitrogen mixture gas having an oxygen concentration of 90% to the third-stage continuous transfer furnace, pressurized the gas discharged from the third-stage continuous transfer furnace, then mixed it with an oxygen-nitrogen mixture gas having a predetermined concentration, and introduced it into the first-stage continuous transfer furnace. Note that the pressure of the atmosphere in all continuous transfer furnaces was controlled to a slightly positive pressure of about 10 Pa as a gauge pressure.

The gas discharged from the third-stage continuous transfer furnace had an oxygen concentration of 88% and a carbon dioxide concentration of 110 ppm. The second-stage continuous transfer furnace was supplied with an oxygen-nitrogen mixture gas having an oxygen concentration of 60%. The first-stage continuous transfer furnace was supplied with a gas having an oxygen concentration of 50% and a carbon dioxide concentration of 40 ppm.

Note that, in Manufacturing Method 2, the oxygen concentration and the carbon dioxide concentration were controlled as follows. An oxygen gas supply system provided with a flow rate meter and a nitrogen gas supply system provided with a flow rate meter were provided upstream of the continuous transfer furnace at each stage. In addition, a zirconia type oxygen concentration meter (LC-860, manufactured by Toray Engineering Co., Ltd.) and a carbon dioxide concentration meter (VA-3000, manufactured by Horiba, Ltd.) using the infrared absorption method were provided on the inlet side and the outlet side of the third-stage continuous transfer furnace, the inlet side of the second-stage continuous transfer furnace, and the inlet side of the first-stage continuous transfer furnace. The third-stage continuous transfer furnace and the second-stage continuous transfer furnace were supplied with the oxygen gas and the nitrogen gas whose flow rates were controlled while measuring the flow rates online with the flow rate meters so as to have predetermined flow rate ratios. Then, it was confirmed that the oxygen concentration on the inlet side of the third-stage continuous transfer furnace was the oxygen concentration (90%) in Table 1. In addition, it was confirmed that the oxygen concentration on the inlet side of the second-stage continuous transfer furnace was the oxygen concentration (60%) in Table 1.

In addition, the first-stage continuous transfer furnace was first supplied with the oxygen gas and the nitrogen gas with controlled flow rates through supply lines provided separately. The flow rate of this gas was controlled such that the total flow rate of the gas supplied to the first-stage continuous transfer furnace was the minimum flow rate of the first-stage continuous transfer furnace. Then, in the state controlled as described above, the oxygen concentration and carbon dioxide concentration of the gas discharged from the third-stage continuous transfer furnace were measured online on the outlet side of the third-stage continuous transfer furnace, and the gas discharged from the third-stage continuous transfer furnace was supplied to the first-stage continuous transfer furnace. At this time, the oxygen gas and the nitrogen gas were supplied from supply lines individually provided to the first-stage continuous transfer furnace while controlling the flow rate so that the oxygen concentration of the gas supplied to the first-stage continuous transfer furnace would be a predetermined concentration and the total flow rate of the gas supplied to the first-stage continuous transfer furnace would be constant.

During the manufacture of sample 9, when an oxygen-nitrogen mixture gas having an oxygen concentration of 28% was supplied from a supply line individually provided to the first-stage continuous transfer furnace, the oxygen concentration on the inlet side of the first-stage continuous transfer furnace became 50%. The carbon dioxide concentration on the inlet side of the first-stage continuous transfer furnace did not exceed 100 ppm during the manufacture of sample 9. However, if the concentration exceeded 100 ppm, the carbon dioxide concentration would be reduced by increasing the total flow rate of the gas supplied to the first-stage continuous transfer furnace. When the total flow rate of the gas supplied to the first-stage continuous transfer furnace is increased in order to reduce the carbon dioxide concentration, the oxygen concentration in the first-stage continuous transfer furnace is controlled by the flow rate of oxygen gas supplied from supply lines individually provided to the first-stage continuous transfer furnace.

[Manufacturing Method 3: Sample 10]

The cathode active material was manufactured by a manufacturing method which performs firing while controlling, among the two or more stages controlled to different firing temperatures, the stage, where the firing temperature is controlled to a lower temperature, in an atmosphere with a lower oxygen concentration than the stage controlled to a higher temperature. The firing was performed in three stages, and the cathode active material according to sample 10 was manufactured as a configuration of combining the gas discharged from the third-stage continuous transfer furnace with the gas discharged from the second-stage continuous transfer furnace and then transferring them to the first-stage. Note that the manufacturing conditions were the same as those of Manufacturing Method 1.

Figure 9:
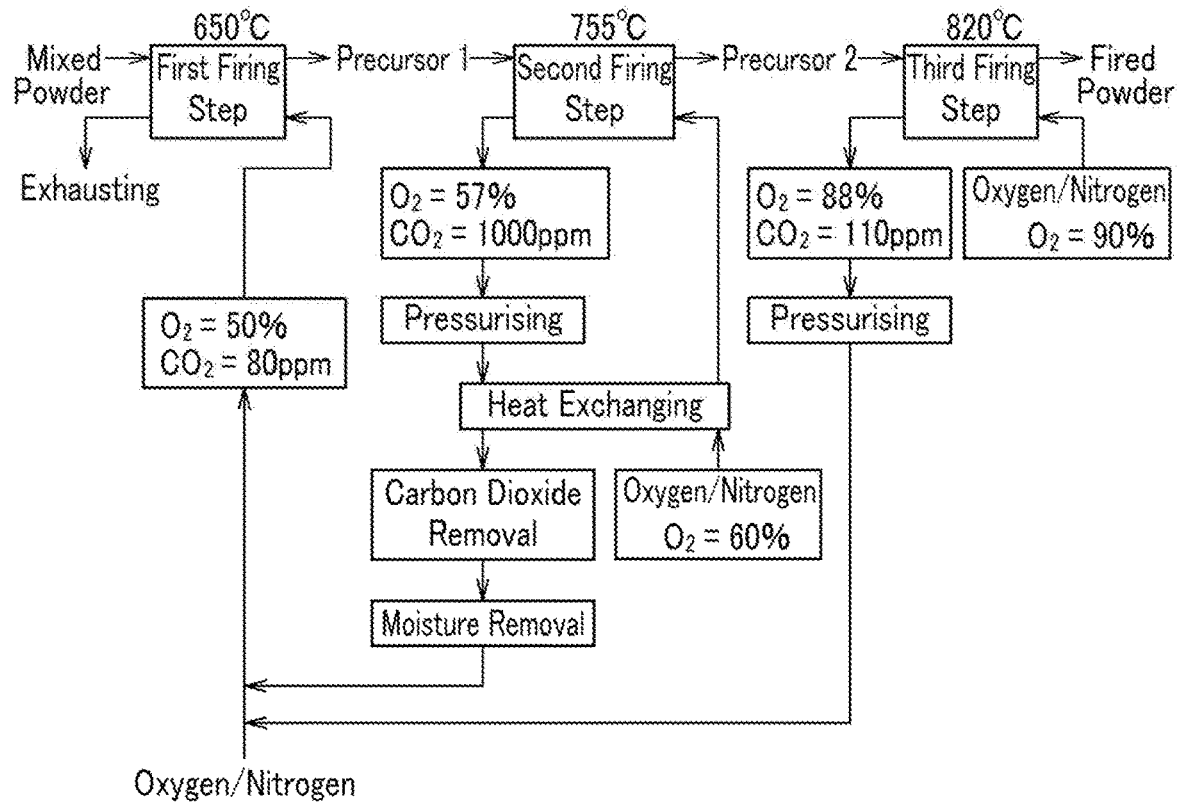
FIG. 9 is a schematic diagram illustrating an overview of the firing steps in Manufacturing Method 3.

FIG. 9 is a schematic diagram illustrating an overview of the firing steps in Manufacturing Method 3. As illustrated in FIG. 9, Manufacturing Method 3 supplied an oxygen-nitrogen mixture gas having an oxygen concentration of 90% to the third-stage continuous transfer furnace. In addition, the second-stage continuous transfer furnace was supplied with an oxygen-nitrogen mixture gas having an oxygen concentration of 60%, the gas discharged from the second-stage continuous transfer furnace was pressurized and then heat-exchanged with the supplied gas, and then carbon dioxide and moisture were removed. Then, the gas discharged from the third-stage continuous transfer furnace and the oxygen-nitrogen mixture gas were combined and mixed, and introduced into the first-stage continuous transfer furnace.

Note that, in the heat exchange, the supplied gas was preheated to 300° C. using the exhaust heat of the exhausted gas. In addition, for removing carbon dioxide, a wet cleaning apparatus for removing carbon dioxide by contact with an aqueous solution of an alkaline compound was used, and an aqueous solution of 12% by mass of sodium hydroxide was used. In addition, an air dryer was used to remove moisture. The pressure of the atmosphere in all continuous transfer furnaces was controlled to a slightly positive pressure of about 10 Pa as a gauge pressure.

The gas discharged from the third-stage continuous transfer furnace had an oxygen concentration of 88% and a carbon dioxide concentration of 110 ppm. In addition, the gas discharged from the second-stage continuous transfer furnace had an oxygen concentration of 57% and a carbon dioxide concentration of 1000 ppm. As a result of mixing the oxygen-nitrogen mixture gas with reduced oxygen and the third-stage and second-stage exhaust gases, the first-stage continuous transfer furnace was introduced with a gas having an oxygen concentration of 50% and a carbon dioxide concentration of 80 ppm.

Note that, in Manufacturing Method 3, the oxygen concentration and the carbon dioxide concentration were controlled as follows. An oxygen gas supply system provided with a flow rate meter and a nitrogen gas supply system provided with a flow rate meter were provided upstream of the continuous transfer furnace at each stage. In addition, a zirconia type oxygen concentration meter (LC-860, manufactured by Toray Engineering Co., Ltd.) and a carbon dioxide concentration meter (VA-3000, manufactured by Horiba, Ltd.) using the infrared absorption method were provided on the inlet side and the outlet side of the third-stage continuous transfer furnace, the inlet side and the outlet side of the second-stage continuous transfer furnace, and the inlet side of the first-stage continuous transfer furnace. The third-stage continuous transfer furnace and the second-stage continuous transfer furnace were supplied with the oxygen gas and the nitrogen gas whose flow rates were controlled while measuring the flow rates online with the flow rate meters so as to have predetermined flow rate ratios. Then, it was confirmed that the oxygen concentration on the inlet side of the third-stage continuous transfer furnace was the oxygen concentration (90%) in Table 1. In addition, it was confirmed that the oxygen concentration on the inlet side of the second-stage continuous transfer furnace was the oxygen concentration (60%) in Table 1.

In addition, the first-stage continuous transfer furnace was first supplied with the oxygen gas and the nitrogen gas with controlled flow rates through supply lines provided separately. The flow rate of this gas was controlled such that the total flow rate of the gas supplied to the first-stage continuous transfer furnace was the minimum flow rate of the first-stage continuous transfer furnace. Then, in the state controlled as described above, the oxygen concentration and carbon dioxide concentration of the gas discharged from the third-stage continuous transfer furnace were measured online on the outlet side of the third-stage continuous transfer furnace, and the gas discharged from the third-stage continuous transfer furnace was supplied to the first-stage continuous transfer furnace. In addition, the oxygen concentration and carbon dioxide concentration of the gas discharged from the second-stage continuous transfer furnace were measured online on the outlet side of the second-stage continuous transfer furnace, and the gas discharged from the second-stage continuous transfer furnace was supplied to the first-stage continuous transfer furnace. At this time, the oxygen gas and the nitrogen gas were supplied from supply lines individually provided to the first-stage continuous transfer furnace while controlling the flow rate so that the oxygen concentration of the gas supplied to the first-stage continuous transfer furnace would be a predetermined concentration and the total flow rate of the gas supplied to the first-stage continuous transfer furnace would be constant.

During the manufacture of sample 10, heat exchange was performed between the inlet side and the outlet side of the second-stage continuous transfer furnace, and carbon dioxide and moisture were removed on the outlet side of the second-stage continuous transfer furnace. The carbon dioxide concentration of the gas supplied to the first-stage continuous transfer furnace did not exceed 100 ppm during the manufacture of sample 10. However, if the concentration exceeded 100 ppm, the carbon dioxide concentration would be reduced by increasing the total flow rate of the gas supplied to the first-stage continuous transfer furnace. When the total flow rate of the gas supplied to the first-stage continuous transfer furnace is increased in order to reduce the carbon dioxide concentration, the oxygen concentration in the first-stage continuous transfer furnace is controlled by the flow rate of oxygen gas supplied from supply lines individually provided to the first-stage continuous transfer furnace.

[Specific Surface Area of Cathode Active Material]

The specific surface areas of the cathode active materials according to the prepared samples 1 to 10 were measured. The specific surface areas were determined by the BET method using an automatic specific surface area measuring instrument "BELCAT" (manufactured from BEL Japan, Inc.).

[Discharge Capacity of Cathode Active Material]

The cathode active materials according to the prepared samples 1 to 10 as cathode materials were each used to prepare a lithium ion secondary battery and measure the discharge capacity.

First, the cathode active material, a binder, and a conductive material were mixed to prepare a cathode mixture slurry. Then, the prepared cathode mixture slurry was coated on an aluminum foil having a thickness of 20 μm, dried at 120° C., then compression-molded by a press to an electrode density of 2.6 g/cm$^3$, and punched into a disk having a diameter of 15 mm to prepare a cathode. In addition, an anode was prepared using lithium metal as an anode active material.

Subsequently, the prepared cathode and anode were used to prepare a lithium ion secondary battery. The nonaqueous electrolyte solution used was a solution in which $LiPF_6$ was dissolved to a concentration of 1.0 mol/L in a solvent produced by mixing ethylene carbonate and dimethyl carbonate to a volume ratio of 3:7.

Each of the lithium ion secondary batteries using the cathode active materials according to samples 1 to 10 was charged and discharged under the following conditions to measure the discharge capacity. The charging was performed at a constant current and a constant voltage up to a charging end voltage of 4.2 V with a charging current of 0.2 CA, and the discharging was performed at a constant current up to a discharge end voltage of 2.5 V with a discharge current of 0.2 CA. In this way, the discharge capacity was measured. Note that the comparative examples were added with *.

The following Table 1 presents the methods for manufacturing samples 1 to 10, the oxygen concentration in the atmosphere controlled at each stage, the specific surface area, and the discharge capacity. In addition, the table presents the degree of oxygen amount reduced during firing (oxygen saving degree) by relative evaluation to sample 7. With all stages combined, a rating "⊚" was given when the oxygen content reduced was 30% or more, a rating "○" was given when the oxygen content reduced was 10% or more and less than 30%, and a rating "Δ" was given when the oxygen content reduced was less than 10%.

TABLE 1

|  | Manufacturing Method | Oxygen Concentration [%] | | | Specific Surface Area [m2/g] | Discharge Capacity [Ah/kg] | Cost Reduction (Oxygen Saving Degree) |
|---|---|---|---|---|---|---|---|
|  |  | First Firing Step | Second Firing Step | Third Firing Step |  |  |  |
| Sample 1 | 1 | 50 | 100 | 100 | 1.02 | 189 | ○ |
| Sample 2 | 1 | 100 | 60 | 100 | 1.05 | 190 | ○ |
| Sample 3* | 1 | 100 | 100 | 90 | 1.15 | 191 | Δ |

TABLE 1-continued

|  | Manufacturing Method | Oxygen Concentration [%] | | | Specific Surface Area [m2/g] | Discharge Capacity [Ah/kg] | Cost Reduction (Oxygen Saving Degree) |
|---|---|---|---|---|---|---|---|
|  |  | First Firing Step | Second Firing Step | Third Firing Step |  |  |  |
| Sample 4 | 1 | 35 | 100 | 100 | 0.50 | 175 | ○ |
| Sample 5 | 1 | 100 | 50 | 100 | 0.68 | 183 | ○ |
| Sample 6* | 1 | 100 | 100 | 80 | 0.74 | 184 | Δ |
| Sample 7* | 1 | 100 | 100 | 100 | 1.17 | 190 | — |
| Sample 8 | 1 | 50 | 60 | 90 | 1.00 | 188 | ◎ |
| Sample 9 | 2 | 50 | 60 | 90 | 0.95 | 188 | ◎ |
| Sample 10 | 3 | 50 | 60 | 90 | 0.88 | 187 | ◎ |

As shown in Table 1, for samples 1 to 3, the oxygen concentration in anyone of the firing stages was controlled to lower, and a discharge capacity was obtained equivalent to that for sample 7 in which the oxygen concentration at all stages was controlled to 100%. On the other hand, for samples 4 to 6, the oxygen concentration in the firing stage was further lowered, and thus the specific surface area was reduced and the discharge capacity was also reduced. It is considered that the required oxygen partial pressure depending on the firing temperature at each stage of firing could not be ensured, resulting in the coarsening of the crystals of the lithium composite compound, and the lowering of the purity of the crystals due to the residual lithium carbonate.

For sample 8, firing was performed while controlling, among the two or more stages controlled to different firing temperatures, the stage, where the firing temperature is controlled to a lower temperature, in an atmosphere with a lower oxygen concentration. Thus, a discharge capacity was obtained equivalent to that for sample 7. In addition, the amount of oxygen consumed in the entire firing steps was reduced to about 57% of the case (sample 7) of supplying an oxygen gas having an oxygen concentration of 100% to all the continuous transfer furnaces in Production Example 1.

For sample 9, firing was performed while controlling, among the two or more stages controlled to different firing temperatures, the stage, where the firing temperature is controlled to a lower temperature, in an atmosphere with a lower oxygen concentration. Thus, a discharge capacity was obtained equivalent to that for sample 7. In addition, since the configuration was such that the gas discharged from the third stage atmosphere was transferred to the first stage, the amount of oxygen consumed in the entire firing steps was reduced to about 47% of that for sample 7.

For sample 10, firing was performed while controlling, among the two or more stages controlled to different firing temperatures, the stage, where the firing temperature is controlled to a lower temperature, in an atmosphere with a lower oxygen concentration. Thus, a discharge capacity was obtained equivalent to that for sample 7. In addition, since the configuration was such that the gas discharged from the third stage atmosphere and the gas discharged from the second stage atmosphere were transferred to the first stage, the amount of oxygen consumed in the entire firing steps was reduced to about 39% of that for sample 7.

Note that the above manufacturing method caries out three stages of firing, but there may be four or more stages. Also in this case, firing is performed while controlling the stage controlled to a lower temperature in an atmosphere having a lower oxygen concentration than the stage controlled to a higher temperature. In addition, firing can be performed multiple times repeatedly at each stage of firing. For example, in the second firing step, it is effective to repeat the firing multiple times in order to oxidize nickel and sufficiently desorb carbon dioxide.

REFERENCE SIGNS LIST

1 Firing Apparatus
10A Firing Furnace
10B Firing Furnace
10a Gas Inlet
10b Gas Outlet
20A Oxygen Supplier
20B Oxygen Supplier
24A Oxygen Flow Rate Adjustment Valve
24B Oxygen Flow Rate Adjustment Valve
30B Heat Exchanger
34B Cooling Water Flow Rate Adjustment Valve
40 Blower
42 Flow Rate Sensor
44 Return Flow Rate Adjustment Valve
50 Carbon Dioxide Removal Apparatus (Carbon Dioxide Removal Means)
60 Drying Apparatus
100 Lithium Ion Secondary Battery
101 Battery Can
102 Battery Cover
103 Cathode Lead Tab
104 Anode Lead Tab
105 Insulation Plate
106 Sealant
110 Rolled Electrode Group
111 Cathode
111a Cathode Current Collector
111b Cathode Mixture Layer
112 Anode
112a Anode Collector
112b Anode Mixture Layer
113 Separator
210 Gas Supply Pipe
220 Gas Exhaust Pipe
230 Gas Transfer Pipe
s1 Temperature Sensor
s2 Carbon Dioxide Sensor

The invention claimed is:

1. A method for manufacturing a cathode active material used for a lithium ion secondary battery and represented by the following formula (1), comprising:
a mixing step of mixing lithium carbonate and a compound containing a metal element shown in the following formula (1) other than Li; and
a firing step of producing a lithium composite compound represented by the following formula (1) by firing a precursor produced through the mixing step, wherein
the firing step includes at least one of a first stage of controlling a firing temperature to less than 720° C. and a second stage of controlling a firing temperature to 720° C. or more and less than 770° C.,
the firing step further includes a third stage of controlling a firing temperature to 770° C. or more,
the first stage is controlled to have an atmosphere having an oxygen concentration of from 45% to 75% both inclusive,
the second stage is controlled to have an atmosphere having an oxygen concentration of from 55% to 85% both inclusive,
the third stage is controlled to have an atmosphere having an oxygen concentration of from 80% to 100% both inclusive, and
the firing is performed while a gas discharged from the atmosphere of the third stage is introduced into at least one of the atmosphere of the first stage and the atmosphere of the second stage $$Li_{1+a}M1O_{2+\alpha} \tag{1}$$

provided that (a) in the formula (1), M1 is a metal element other than Li and contains at least Ni and (b) a and a are numbers satisfying $-0.1 \leq a \leq 0.2$ and $-0.2 \leq \alpha \leq 0.2$ respectively.

2. The method for manufacturing a cathode active material used for a lithium ion secondary battery according to claim 1, wherein the discharged gas is introduced after a carbon dioxide concentration is reduced to 0.02% or less.

3. The method for manufacturing a cathode active material used for a lithium ion secondary battery according to claim 2, wherein a carbon dioxide removal means is used to reduce the carbon dioxide concentration by removing carbon dioxide.

4. A method for manufacturing a cathode active material used for a lithium ion secondary battery and represented by the following formula (1), comprising:
a mixing step of mixing lithium carbonate and a compound containing a metal element shown in the following formula (1) other than Li; and
a firing step of producing a lithium composite compound represented by the following formula (1) by firing a precursor produced through the mixing step, wherein
the firing step includes a fourth stage of controlling a firing temperature to less than 720° C., a fifth stage of controlling a firing temperature to 720° C. or more and less than 770° C., and a sixth stage of controlling a firing temperature to 770° C. or more,
the fourth stage is controlled to have an atmosphere having an oxygen concentration of from 45% to 75% both inclusive,
the fifth stage is controlled to have an atmosphere having an oxygen concentration of from 55% to 85% both inclusive,
the sixth stage is controlled to have an atmosphere having an oxygen concentration of from 80% to 100% both inclusive, and
the firing is performed while gases discharged from the atmosphere of the fifth stage and discharged from the atmosphere of the sixth stage is introduced into the atmosphere of the fourth stage $$Li_{1+a}M1O_{2+\alpha} \tag{1}$$

provided that (a) in the formula (1), M1 is a metal element other than Li and contains at least Ni and (b) a and a are numbers satisfying $-0.1 \leq a \leq 0.2$ and $-0.2 \leq \alpha \leq 0.2$ respectively.

5. The method for manufacturing a cathode active material used for a lithium ion secondary battery according to claim 4, wherein the discharged gas is introduced after a carbon dioxide concentration is reduced to 0.02% or less.

6. The method for manufacturing a cathode active material used for a lithium ion secondary battery according to claim 5, wherein a carbon dioxide removal means is used to reduce the carbon dioxide concentration by removing carbon dioxide.

7. The method for manufacturing a cathode active material used for a lithium ion secondary battery according to claim 6, wherein a carbon dioxide removal means is used to reduce the carbon dioxide concentration by removing carbon dioxide.

* * * * *